United States Patent
Iltsuka et al.

(10) Patent No.: US 7,319,572 B2
(45) Date of Patent: Jan. 15, 2008

(54) THIN FILM COIL AND METHOD OF FORMING THE SAME, AND THIN FILM MAGNETIC HEAD AND METHOD OF MANUFACTURING THE SAME

(75) Inventors: Daisuke IItsuka, Saku (JP); Fujimi Kimura, Tokyo (JP)

(73) Assignees: TDK Corporation, Tokyo (JP); SAE Magnetick (H.K.) Ltd., Hong Kong (CN)

( * ) Notice: Subject to any disclaimer, the term of this patent is extended or adjusted under 35 U.S.C. 154(b) by 440 days.

(21) Appl. No.: 10/849,194

(22) Filed: May 20, 2004

(65) Prior Publication Data

US 2004/0240106 A1 Dec. 2, 2004

(30) Foreign Application Priority Data

May 29, 2003 (JP) ............................. 2003-153425

(51) Int. Cl.
G11B 5/17 (2006.01)
(52) U.S. Cl. ....................................... 360/123; 360/126
(58) Field of Classification Search ................ 360/123, 360/126
See application file for complete search history.

(56) References Cited

U.S. PATENT DOCUMENTS

| | | | |
|---|---|---|---|
| 4,651,248 A * | 3/1987 | Shiiki et al. ................ 360/119 |
| 6,191,916 B1 * | 2/2001 | Sasaki ......................... 360/126 |
| 6,195,232 B1 * | 2/2001 | Cohen ......................... 360/126 |
| 6,400,525 B1 | 6/2002 | Sasaki et al. |
| 6,466,401 B1 * | 10/2002 | Hong et al. .................. 360/123 |
| 6,940,689 B2 * | 9/2005 | Sasaki et al. ................ 360/123 |
| 7,119,987 B2 * | 10/2006 | Sasaki et al. ................ 360/123 |
| 7,151,647 B2 * | 12/2006 | Sasaki et al. ................ 360/126 |
| 2003/0002210 A1 * | 1/2003 | Inaguma ...................... 360/123 |
| 2004/0123449 A1 * | 7/2004 | Inaguma .................... 29/603.24 |
| 2005/0068675 A1 * | 3/2005 | Sasaki et al. ................ 360/126 |
| 2005/0188530 A1 * | 9/2005 | Sasaki et al. ............. 29/603.01 |

FOREIGN PATENT DOCUMENTS

| | | |
|---|---|---|
| JP | A-11-259813 | 9/1999 |
| JP | A 2001-60307 | 3/2001 |
| JP | A 2002-343639 | 11/2002 |

* cited by examiner

Primary Examiner—Jefferson Evans
(74) Attorney, Agent, or Firm—Oliff & Berridge, PLC

(57) ABSTRACT

Provided are a thin film coil formed at high densities, a method of forming a thin film coil, a thin film magnetic head which includes the thin film coil and thus enables ensuring stable recording characteristics while coping with a higher recording density, and a method of manufacturing a thin film magnetic head. The thin film coil includes a first coil having a top surface having the maximum width, an insulating wall formed by selectively etching an insulating layer filling a region between windings by using the first coil as a mask, and a second coil isolated from the first coil by the insulating wall. This easily enables forming the thin film coil in a narrower space, while ensuring electrical insulation between the windings of the first and second coils.

6 Claims, 20 Drawing Sheets

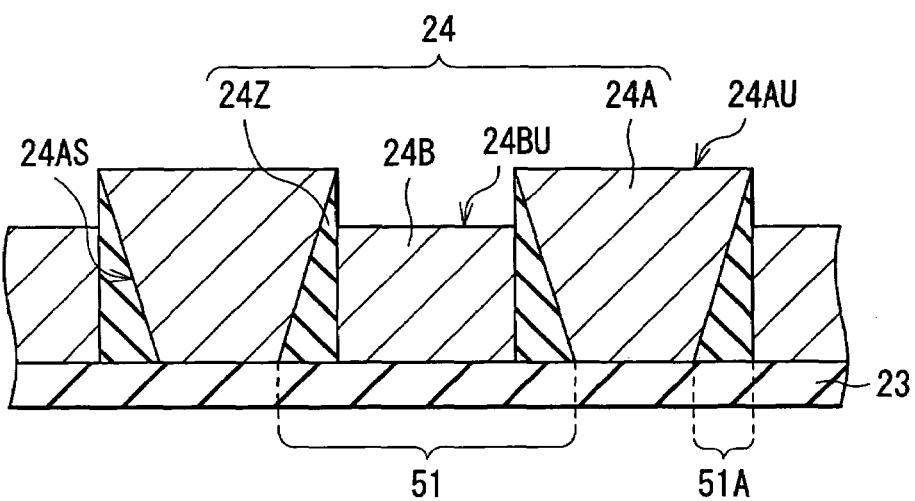
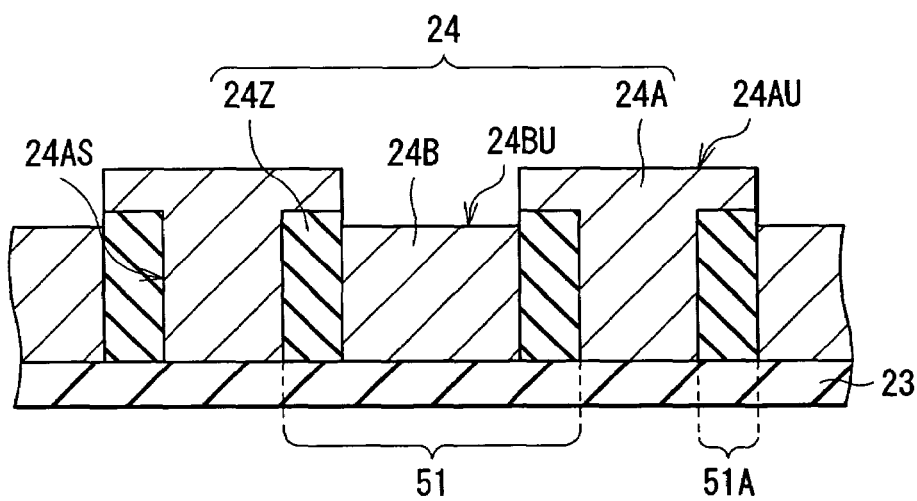
FIG. 21A
FIG. 21B

THIN FILM COIL AND METHOD OF FORMING THE SAME, AND THIN FILM MAGNETIC HEAD AND METHOD OF MANUFACTURING THE SAME

BACKGROUND

The invention relates to a thin film coil spirally wound, a method of forming a thin film coil, a thin film magnetic head including a thin film coil, and a method of manufacturing a thin film magnetic head.

Recently, improvement in performance of a thin film magnetic head has been sought in accordance with an increase in a surface recording density of a magnetic recording medium (hereinafter referred to simply as a "recording medium"), such as a hard disk. Widely used as the thin film magnetic head is, for example, a combined thin film magnetic head comprising a combination of a recording head having an inductive magnetic transducer for use in recording and a reproducing head having a magnetoresistive element for use in reproducing. The recording head is provided with a thin film coil which generates a magnetic flux to record data on the recording medium, and the thin film coil is one determinant factor of a magnetic path length closely related to the performance of the recording head. The magnetic path length corresponds to the length between a surface of the thin film magnetic head to be faced with the recording medium (hereinafter, the surface is referred to as an "air bearing surface") and the position at which there are coupled two magnetic layers which are disposed with the thin film coil in between and each contain a magnetic pole. It is generally required that the magnetic path length be short. The reason is as follows. A short magnetic path length allows improvement in characteristics such as the flux rise time and nonlinear transition shift (NLTS), thus achieving improvement in the performance of the recording head. On the other hand, the thin film coil is required to exhibit lower electrical resistance.

General methods of forming such a thin film coil include a method utilizing photolithographic technique (see Japanese Unexamined Patent Application Publication No. 2001-60307, for example). Specifically, this method involves the following procedure. First, a substrate having a metal underlayer film formed thereon is coated with a photoresist film, on which a spiral resist pattern is then formed by use of photolithography. Then, a spiral conductive film is formed by means of plating using the metal underlayer film so as to fill a region between windings in the spiral resist pattern. Then, after the removal of the resist pattern, the metal underlayer film is removed by use of ion milling or the like, and an exposed gap in the conductive film is filled with an organic insulator such as a resist or an inorganic insulator such as aluminum oxide. The thin film coil is completed through the above-described procedure.

However, the method disclosed in the above patent literature 1 has difficulty in coping with a recent increase in the surface recording density. More specifically, an increase in the surface recording density of the recording medium requires that the recording head be of a minute size, and also requires that the thin film coil be formed within a very limited region (that is, within the width of stack as viewed in the in-plane direction of stack or within the thickness of stack as viewed in the direction of stack). In this case, the thin film coil is also required to exhibit lower electrical resistance, and therefore the thin film coil needs a small pitch of adjacent windings (that is, a narrow width of the region between windings), while ensuring that each winding (or turn) of the thin film coil has a certain width (or cross-sectional area). Thus, when the method disclosed in Japanese Unexamined Patent Application Publication No. 2001-60307 is used, the resist pattern must be formed so that its spiral portion has a smaller width. However, such a smaller width causes the resist pattern to deform or peel off in the spiral portion thereof, or causes the metal underlayer film to remain or be otherwise affected. Consequently, the above method has difficulty in reducing the width of the region between windings of the thin film coil. Thus, there has been also proposed a thin film coil having a double layer structure which ensures the cross-sectional area of each winding. However, this structure has the problem of causing an increase in the thickness of stack as viewed in the direction of stack.

Methods to solve this problem include, for example, a method which involves forming a first coil, then forming an insulating film on surfaces of the first coil (that is, the top and side surfaces thereof) and a bottom surface of a region between windings of the first coil, and then forming a second coil in the region between windings of the first coil, which is disclosed (in Japanese Unexamined Patent Application Publication No. 2002-343639, for instance). With this method, a thin film coil comprises a series of the first and second coils which are connected so that one end of the first coil is connected to one end of the second coil. The method disclosed in Japanese Unexamined Patent Application Publication No. 2002-343639 can be used to manufacture the thin film coil comprising the first and second coils which are formed in one plane at relatively high densities with the insulating film in between.

However, the method disclosed in Japanese Unexamined Patent Application Publication No. 2002-343639 has the problem that the side surfaces of the first coil may not be sufficiently covered with the insulating film. There is a strong tendency for this problem to arise, in particular when sputtering, evaporation or the like is used to deposit the insulating film on the surfaces of the first coil. For example when sputtering is used for deposition, it is necessary to appropriately set various conditions such as the degree of vacuum at which sputtering takes place, a sputter deposition rate, and the distance between a target and a substrate, and moreover the insulating film may partially have an insufficient thickness due to uncertainties such as variations in surface properties of the first coil and non-uniformity in the tilt angles of the side surfaces of the first coil. At the stage after the formation of the insulating film, it is also difficult to see whether or not the insulating film has a sufficient thickness. This may cause insufficient electrical insulation between the windings of the first and second coils and thus result in an electrical short circuit.

SUMMARY

The invention is designed to overcome the foregoing problems. It is an object of the invention to provide a thin film coil formed at high densities within a minute region, a method of forming a thin film coil, a thin film magnetic head which includes the thin film coil and thus enables ensuring stable recording characteristics while coping with a higher recording density, and a method of manufacturing a thin film magnetic head.

A thin film coil of the invention includes: a spiral first coil formed on a substrate, the first coil being wound around an axis perpendicular to the in-plane direction of the substrate in the in-plane direction thereof, the first coil having an end surface having the greatest width, the end surface being located opposite to the substrate; a second coil formed in a region between windings of the first coil; and an insulating wall which isolates the first coil from the second coil. As employed herein, the "insulating wall" refers to a structural component which physically and electrically isolates the first coil from the second coil.

A thin film magnetic head of the invention includes: at least two magnetic layers magnetically coupled to each other and facing each other with a gap layer in between near and in a surface to be faced with a recording medium; and a thin film coil sandwiched in between the two magnetic layers or in between other magnetic layers coupled to the two magnetic layers, the thin film coil including: a spiral first coil formed on a substrate, the first coil being wound around an axis perpendicular to the in-plane direction of the substrate in the in-plane direction thereof, the first coil having an end surface having the greatest width, the end surface being located opposite to the substrate; a second coil formed in a region between windings of the first coil; and an insulating wall which isolates the first coil from the second coil.

In the thin film coil or the thin film magnetic head of the invention, the first coil is configured so that the end surface opposite to the substrate has the greatest width and its side surface overhangs. The insulating wall is configured to fill this overhang region, thus providing insulation between the first and second coils.

In the thin film coil of the invention, the first coil may have a progressively greater width farther away from the substrate. The first coil may be formed by using plating, sputtering or chemical vapor deposition. The insulating wall may become progressively thinner farther away from the substrate. The insulating wall may be made of a cured fluidic organic material or spin on glass (SOG).

A method of forming a thin film coil according to a first aspect of the invention includes the steps of: forming a spiral first coil on a substrate, the first coil being wound around an axis perpendicular to the in-plane direction of the substrate in the in-plane direction thereof, the first coil having an end surface having the greatest width, the end surface being located opposite to the substrate; forming an insulating layer so as to fill a region between windings of the first coil; selectively etching the insulating layer using the first coil as a mask so that a side surface of the first coil is covered with an insulating wall formed of a part of the insulating layer; and forming a second coil so as to fill the region between windings having the side surface covered with the insulating wall.

A method of manufacturing a thin film magnetic head according to the first aspect of the invention including at least two magnetic layers magnetically coupled to each other and facing each other with a gap layer in between near and in a surface to be faced with a recording medium, and a thin film coil sandwiched in between the two magnetic layers or in between other magnetic layers coupled to the two magnetic layers includes the step of forming the thin film coil including the steps of: forming a spiral first coil on a substrate, the first coil being wound around an axis perpendicular to the in-plane direction of the substrate in the in-plane direction thereof, the first coil having an end surface having the greatest width, the end surface being located opposite to the substrate; forming an insulating layer so as to fill a region between windings of the first coil; selectively etching the insulating layer using the first coil as a mask so that a side surface of the first coil is covered with an insulating wall formed of a part of the insulating layer; and forming a second coil so as to fill the region between windings having the side surface covered with the insulating wall.

The method of forming a thin film coil or the method of manufacturing a thin film magnetic head according to the first aspect of the invention includes previously forming the insulating layer so as to fill the region between windings of the spiral first coil having the end surface having the greatest width, the end surface being located opposite to the substrate; and then selectively etching the insulating layer using the first coil as the mask. Thus, the method allows forming the insulating wall which covers the side surface of the first coil.

In the method of forming a thin film coil according to the first aspect of the invention, the step of forming the first coil may include the steps of: forming a resist layer including a spiral pattern on the substrate, the spiral pattern having an end surface having the smallest width, the end surface being located opposite to the substrate; and forming the first coil so as to fill a region between windings of the spiral pattern. In this case, the first coil may be formed so that the first coil has a progressively greater width farther away from the substrate. Moreover, the first coil may be formed by use of plating. Furthermore, a fluidic organic material or SOG may be used to form the insulating layer. In this case, the insulating layer may be selectively etched so that the insulating wall has a progressively smaller width farther away from the substrate.

A method of forming a thin film coil according to a second aspect of the invention includes the steps of: forming an insulating layer on a substrate; forming a spiral resist pattern on the insulating layer, the resist pattern being wound around an axis perpendicular to the in-plane direction of the substrate in the in-plane direction thereof; selectively etching the insulating layer using the resist pattern as a mask, thereby forming a spiral groove having an opened end having the greatest width, the opened end being located opposite to the substrate; forming a first coil so as to fill the spiral groove, the first coil having an end surface having the greatest width, the end surface being located opposite to the substrate; selectively etching the insulating layer using the first coil as a mask so that a side surface of the first coil is covered with an insulating wall formed of a part of the insulating layer; and forming a second coil so as to fill the region between windings having the side surface covered with the insulating wall.

A method of manufacturing a thin film magnetic head according to the second aspect of the invention including at least two magnetic layers magnetically coupled to each other and facing each other with a gap layer in between near and in a surface to be faced with a recording medium, and a thin film coil sandwiched in between the two magnetic layers or in between other magnetic layers coupled to the two magnetic layers includes the step of forming the thin film coil including the steps of: forming an insulating layer on a substrate; forming a spiral resist pattern on the insulating layer, the resist pattern being wound around an axis perpendicular to the in-plane direction of the substrate in the in-plane direction thereof; selectively etching the insulating layer using the resist pattern as a mask, thereby forming a spiral groove having an opened end having the greatest width, the opened end being located opposite to the substrate; forming a first coil so as to fill the spiral groove, the first coil having an end surface having the greatest width, the end surface being located opposite to the substrate; selectively etching the insulating layer using the first coil as a mask so that a side surface of the first coil is covered with an insulating wall formed of a part of the insulating layer; and forming a second coil so as to fill the region between windings having the side surface covered with the insulating wall.

The method of forming a thin film coil or the method of manufacturing a thin film magnetic head according to the second aspect of the invention includes selectively etching the insulating layer, thereby forming the spiral groove having the opened end having the greatest width, the opened end being located opposite to the substrate; and then forming the first coil so as to fill the spiral groove, the first coil having the end surface having the greatest width, the end surface being located opposite to the substrate. The method further includes selectively etching the insulating layer using the first coil as the mask. Thus, the method allows forming the insulating wall which covers the side surface of the first coil.

In the method of forming a thin film coil according to the second aspect of the invention, the spiral groove may be formed so that the spiral groove has a progressively greater width farther away from the substrate. The first and second coils may be formed by using plating, sputtering or chemical vapor deposition.

Other and further objects, features and advantages of the invention will appear more fully from the following description.

BRIEF DESCRIPTION OF THE DRAWINGS

FIGS. 21A and 21B are partly enlarged cross-sectional views illustrating, in enlarged view, a part of a cross-sectional configuration of a thin film magnetic head according to a modified embodiment of the invention.

DETAILED DESCRIPTION OF EMBODIMENTS

Embodiments of the invention will be described in detail below with reference to the drawings.

First Embodiment

Figure 1:
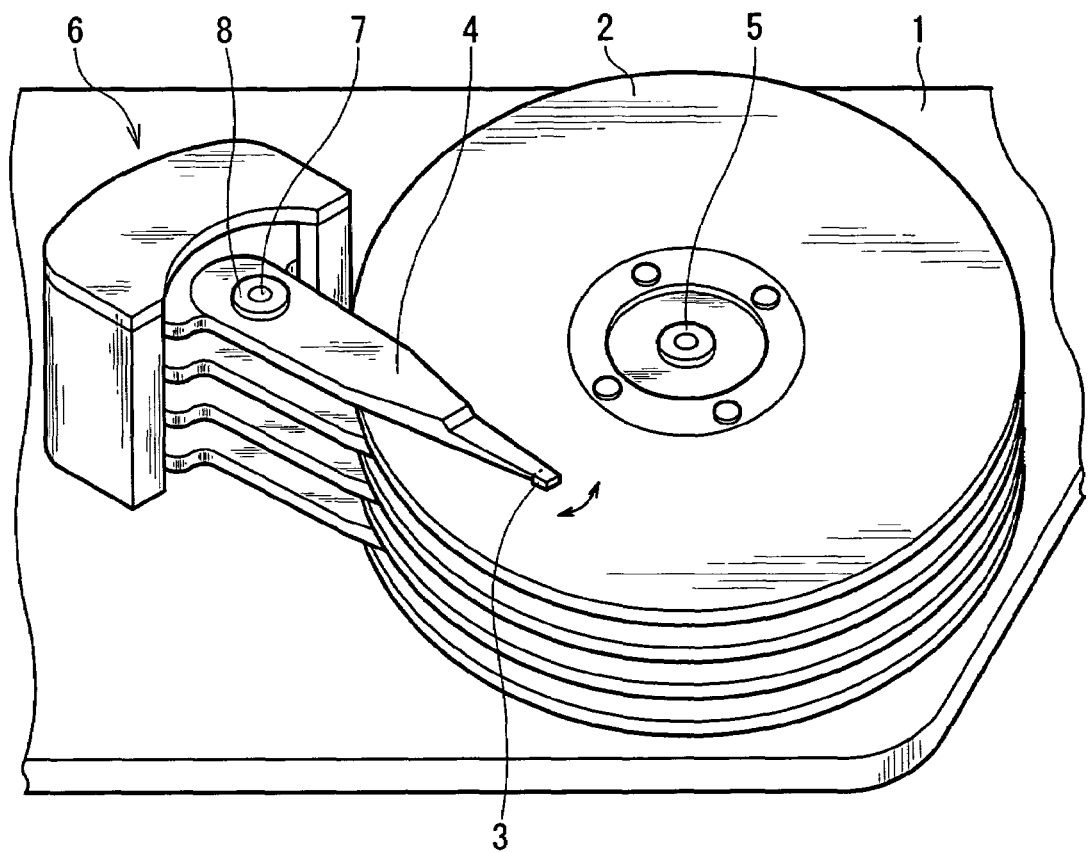
FIG. 1 is a perspective view showing an internal configuration of a magnetic recording apparatus according to an embodiment of the invention.
Figure 2:
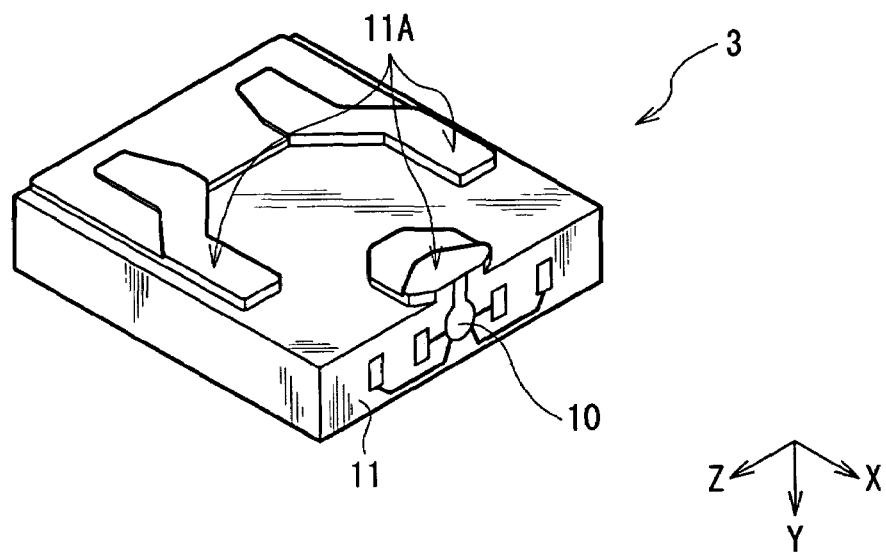
FIG. 2 is a perspective view showing an external configuration of a head slider of the magnetic recording apparatus shown in FIG. 1.

Firstly, the description is given with reference to FIGS. 1 and 2 with regard to the configuration of a magnetic recording apparatus equipped with a thin film magnetic head according to a first embodiment of the invention. Since the thin film magnetic head includes a thin film coil according to the first embodiment of the invention, the thin film magnetic head will be hereinafter described in conjunction with the thin film coil. FIG. 1 is a perspective view showing an internal configuration of the magnetic recording apparatus, and FIG. 2 is a perspective view illustrating, in enlarged view, an external configuration of a head slider which is a principal part of the magnetic recording apparatus.

As shown in FIG. 1, the magnetic recording apparatus includes, for example, a plurality of magnetic disks 2, each of which acts as a recording medium on which information is to be recorded, and a plurality of arms 4, each of which is disposed corresponding to each magnetic disk 2 and has a head slider 3 mounted on its end, which are contained within a housing 1. The magnetic disk 2 is rotatable about a spindle motor 5 fixed to the housing 1. The arm 4 is connected to a drive 6 which acts as a power source, and the arm 4 is pivotable on a bearing 8 about a fixed pivot 7 fixed to the housing 1. In FIG. 1, there is shown, for example, a model that permits a plurality of arms 4 to integrally pivot about the fixed pivot 7.

As shown in FIG. 2, the head slider 3 has a base 11 in substantially the shape of a rectangular parallelepiped having an uneven structure in order that the arm 4 may undergo less air resistance when pivoting, and a thin film magnetic head 10 of perpendicular recording type which is disposed on one side surface of the base 11, and specifically the side surface (shown as a front surface in FIG. 2) is perpendicular to a recording medium facing surface 30 to be faced with the magnetic disk 2 (hereinafter, the surface 30 is referred to as an air bearing surface 30). In FIG. 2, the head slider 3 is shown as being in an inverted position from that shown in FIG. 1 so that the uneven structure on the air bearing surface 30 can be visually recognized.

Figures 3A, 3B:
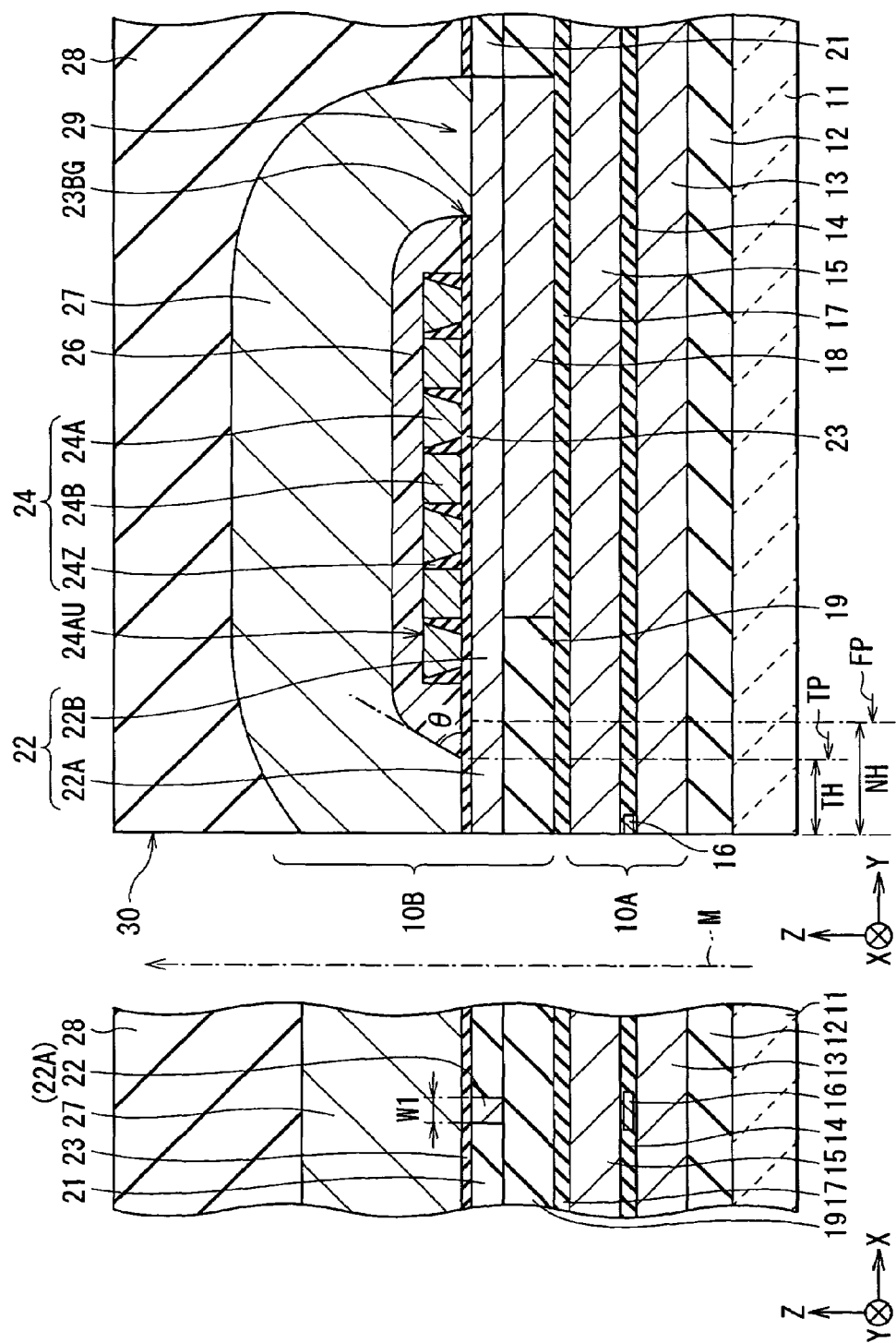
FIGS. 3A and 3B are cross-sectional views showing a cross-sectional configuration of a thin film magnetic head according to the embodiment of the invention.
Figure 4:
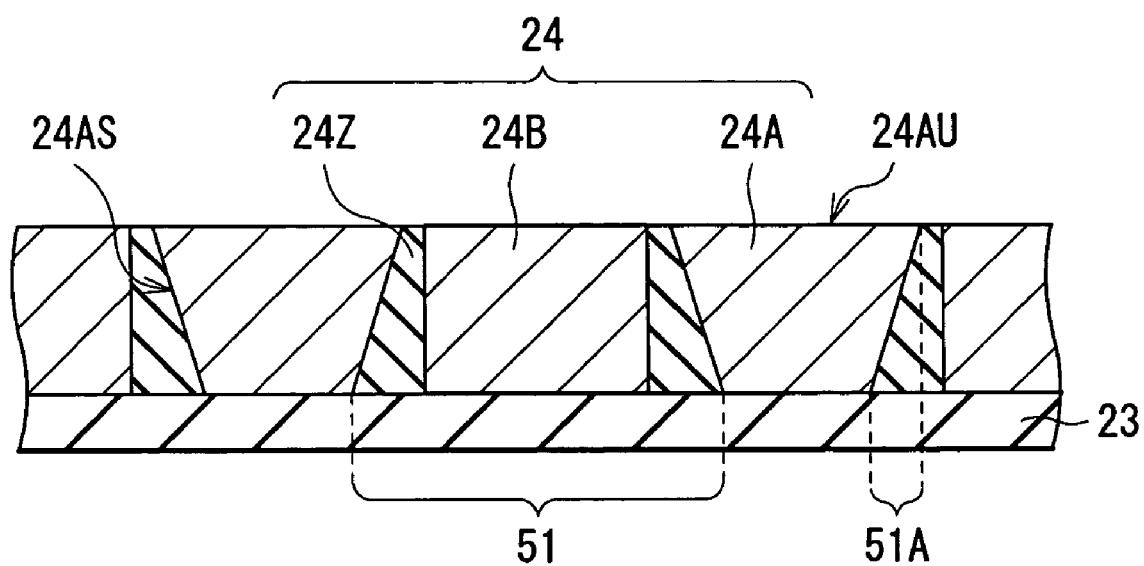
FIG. 4 is a partly enlarged cross-sectional view illustrating, in enlarged view, a part of the cross-sectional configuration of the thin film magnetic head shown in FIG. 3B.
Figure 5:
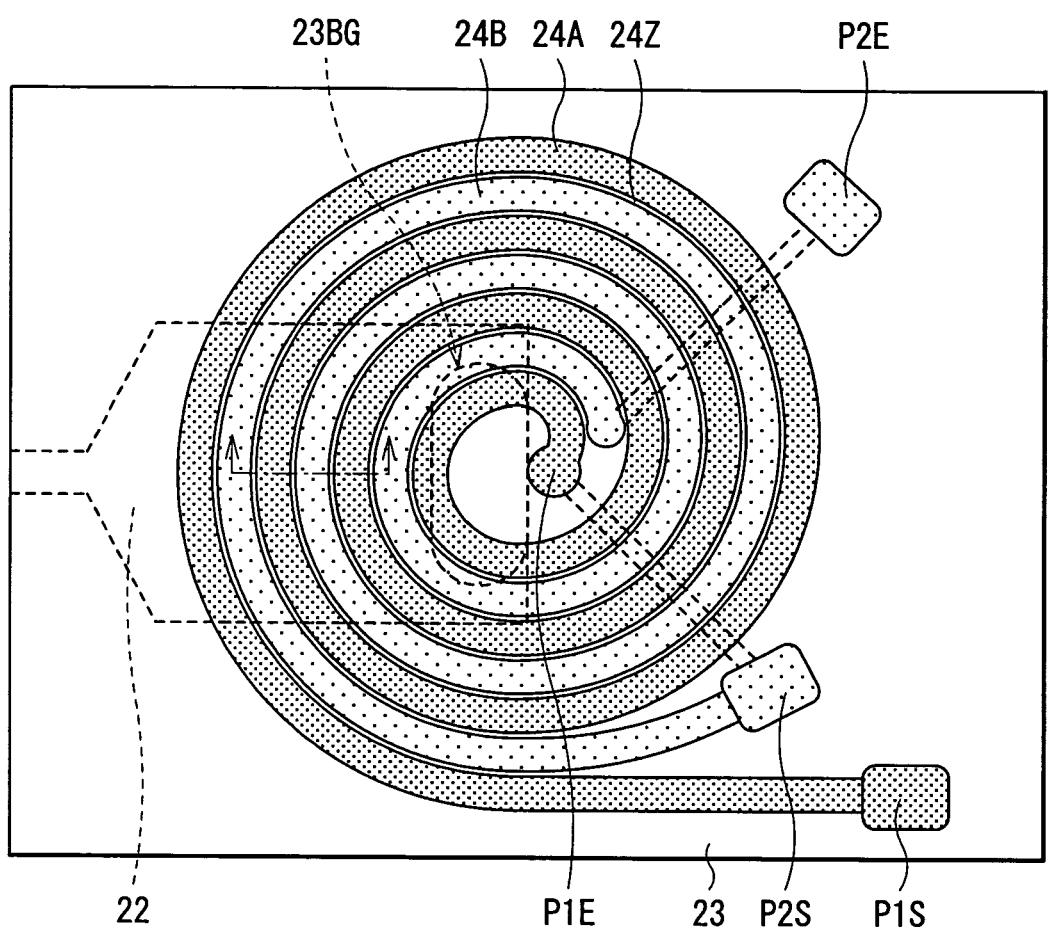
FIG. 5 is a plan view showing a plan configuration of the thin film magnetic head shown in FIG. 3B.

Next, the description is given with reference to FIGS. 3A and 3B to 5 with regard to the configuration of the thin film magnetic head 10. FIGS. 3A and 3B show a cross-sectional configuration of the thin film magnetic head 10, and FIGS. 3A and 3B show the cross-sectional configuration parallel to the air bearing surface 30 and the cross-sectional configuration perpendicular to the air bearing surface 30, respectively. FIG. 4 is a partly enlarged cross-sectional view illustrating, in enlarged view, a part of the configuration shown in FIG. 3B. FIG. 5 shows a plan configuration of the thin film magnetic head 10 shown in FIG. 3B, viewed in the direction of the arrow V of FIG. 3B. The cross-sectional configuration shown in FIG. 3B corresponds to a cross section taken along the line III-III of FIG. 5, viewed in the direction of the arrow of the line III-III. The upward-pointing arrow M shown in FIGS. 3A and 3B indicates a direction in which the magnetic disk 2 (not shown in FIGS. 3A and 3B) travels relative to the thin film magnetic head 10, that is, the travel direction of the magnetic disk 2 (i.e., a medium travel direction).

Hereinafter, the distances along the X, Y and Z axes shown in FIGS. 3A and 3B to 5 are defined as a "width", a "length", and a "thickness or height", respectively. The side close to the air bearing surface 30, as viewed along the Y axis, is defined as the "front or frontward" side, and the opposite side is defined as the "rear or rearward" side. As for the thin film coil, a radial length about an axis around which the coil is wound, however, is defined as a "width".

The thin film magnetic head 10 is, for example, a combined head capable of performing both recording and reproducing functions. As shown in FIGS. 3A and 3B, the thin film magnetic head 10 has a stacked structure comprising an insulating layer 12 made of a nonmagnetic insulating material such as aluminum oxide ($Al_2O_3$), a reproducing head part 10A which performs reproducing utilizing a magnetoresistance (MR) effect, an isolating layer 17 made of a nonmagnetic insulating material such as $Al_2O_3$, a recording head part 10B of single magnetic pole type which performs perpendicular recording, and an overcoat layer 28 made of a nonmagnetic insulating material such as $Al_2O_3$, which are stacked in this sequence on the base 11 made of a ceramic material such as $Al_2O_3$—TiC fine ceramics.

For example, the reproducing head part 10A has a stacked structure comprising a bottom shield layer 13, a shield gap film 14, and a top shield layer 15, which are stacked in this sequence. An MR element 16 which acts as a reproducing device is embedded within the shield gap film 14 in such a manner that one end surface of the MR element 16 is exposed on the air bearing surface 30.

For example, the bottom and top shield layers 13 and 15 are both made of a magnetic material such as a nickel-iron alloy (NiFe (containing, e.g., 80 wt % Ni and 20 wt % Fe)) (hereinafter referred to simply as "Permalloy" (its trade name)), and the layers 13 and 15 each have a thickness of about 1.0 μm to 2.0 μm. The shield gap film 14 serves to electrically isolate the MR element 16 from therearound, and the shield gap film 14 is made of a nonmagnetic insulating material such as $Al_2O_3$. The MR element 16 serves to perform reproducing utilizing, for example, a giant magnetoresistance (GMR) effect, a tunneling magnetoresistance (TMR) effect, or the like.

For example, the recording head part 10B has a stacked structure comprising a magnetic pole layer 29 around which insulating layers 19 and 21 made of $Al_2O_3$ or the like fill gaps, a gap layer 23 having an opening (that is, a back gap 23BG), a thin film coil 24 for generating a magnetic flux, which is covered with an insulating layer 26, and a return yoke layer 27, which are stacked in this sequence. Thus, the thin film coil 24 is sandwiched in between two magnetic layers, that is, the magnetic pole layer 29 and the return yoke layer 27.

The thin film coil 24 includes a first coil 24A formed on the gap layer 23 which acts as a substrate, the first coil 24A being wound around the axis perpendicular to the in-plane direction of the gap layer 23 in the in-plane direction thereof, the first coil 24A having a top surface 24AU having the greatest width, the top surface 24AU being an end surface opposite to the gap layer 23; a second coil 24B formed in a region 51 between windings of the first coil 24A; and an insulating wall 24Z which isolates the first coil 24A from the second coil 24B. The first and second coils 24A and 24B are formed by means of plating or sputtering using a highly conductive material such as copper (Cu). Both ends of each coil are connected to electrodes (not shown) so that in write operation the coils generate a magnetic flux by the electrodes feeding a current through the coils.

As shown in FIG. 4, the first coil 24A has a progressively greater width farther away from the gap layer 23. More specifically, a side surface 24AS overhangs so as to tilt toward the region 51 between windings, thus forming an overhang region 51A. In this instance, the overhang region 51A is the region which is in the shade when the top surface 24AU is viewed in projection in a direction perpendicular to the in-plane direction of the gap layer 23 (i.e., in the direction of the Z axis), that is, the region between a perpendicular from a widthwise edge of the top surface 24AU to the gap layer 23 and the side surface 24AS. The insulating wall 24Z is formed so as to cover the side surface 24AS and fill the overhang region 51A, so that the insulating wall 24Z has a progressively smaller width (or becomes progressively thinner) farther away from the gap layer 23. Thus, the first coil 24A has the shape of an inverted trapezoid having both the side surfaces 24AS overhanging toward the regions 51 between windings, whereas the second coil 24B has a rectangular shape, for example. Desirably, the cross-sectional area of the first coil 24A is equal to that of the second coil 24B. The reason is as follows. The coils having an equal cross-sectional area can achieve lower resistance as well as be formed in a region having a smaller cross-sectional area, as compared to the coils having different cross-sectional areas. Preferably, the insulating wall 24Z is made of, for example, a cured fluidic organic material in order to facilitate covering the side surface 24AS. Alternatively, the insulating wall 24Z may be made of spin on glass (SOG). Desirably, the levels of the top surfaces of the first and second coils 24A and 24B and the insulating wall 24Z (i.e., the surfaces thereof opposite to the gap layer 23) are contained in one plane (or the coils 24A and 24B and the wall 24Z have a uniform thickness), as shown in FIG. 4. The reason is as follows. This configuration allows a further decrease in the thickness of the recording head part 10B. However, it is not necessarily required that the first and second coils 24A and 24B and the insulating wall 24Z be configured in this manner.

The magnetic pole layer 29 serves to contain a magnetic flux generated by the thin film coil 24 and emit the magnetic flux to the magnetic disk 2. For example, the magnetic pole layer 29 has a double-layer stacked structure comprising a main magnetic pole layer 22 which functions as a main magnetic flux emitting portion, and an auxiliary magnetic pole layer 18 which functions as an auxiliary magnetic flux containing portion for ensuring the magnetic volume of the main magnetic pole layer 22 (i.e., the volume of magnetic flux contained in the layer 22). The main magnetic pole layer 22 extends from the air bearing surface 30 in the direction away from the surface 30. The main magnetic pole layer 22 includes a front end portion 22A extending from the air bearing surface 30 and having a uniform width W1 that defines a write track width, and a rear end portion 22B coupled to a rearward part of the front end portion 22A and having a width W2 greater than the width W1 of the front end portion 22A (W2>W1). The width W1 of the front end portion 22A is, for example, about 0.2 μm or less. For example, the width of the rear end portion 22B is equal to the uniform width W2 in its rearward part and is progressively smaller in its frontward part closer to the front end portion 22A. The point at which the width of the main magnetic pole layer 22 increases from the width W1 of the front end portion 22A to the width W2 of the rear end portion 22B is a "flare point FP" which is one important determinant factor of the recording performance of the thin film magnetic head 10. For example, the main magnetic pole layer 22 is made of a magnetic material having a saturation magnetic flux density of 2.4 T (tesla), specifically a magnetic material such as an iron-cobalt alloy (FeCo) or an iron-cobalt-nickel alloy (FeCoNi), and the layer 22 has a thickness of about 0.2 μm to 0.3 μm.

For example, the auxiliary magnetic pole layer 18 is located on the leading side (or the side into which the medium flows) of the main magnetic pole layer 22, and the layer 18 extends from a rearward position relative to the air bearing surface 30 in the direction away from the rearward position and is coupled to the main magnetic pole layer 22. For example, the auxiliary magnetic pole layer 18 is made of the same magnetic material as the main magnetic pole layer 22 and has a rectangular shape in plan configuration. As employed herein, a "coupled" state does not refer to simply a contact state but refers to a contact and magnetically conductible state. The detailed description is given with regard to the meaning of the "leading side" (or the "side into which the medium flows") in conjunction with the description of the configuration of the return yoke layer 27 as will be given below.

The gap layer 23 serves to provide a magnetic gap between the main magnetic pole layer 22 and the return yoke layer 27 near the air bearing surface 30. For example, the gap layer 23 is made of a nonmagnetic insulating material such as $Al_2O_3$ and has a thickness of about 0.2 μm or less.

The insulating layer 26 serves to electrically isolate the thin film coil 24 from therearound. For example, the insulating layer 26 is made of a material to which heating imparts fluidity, such as a photoresist (or a photosensitive resin) or SOG, and the insulating layer 26 has a rounded slope on its surface. The position of the most front end of the insulating layer 26 is a "throat height zero position TP" which is one important determinant factor of the recording performance of the thin film magnetic head 10. The distance between the throat height zero position TP and the air bearing surface 30 is a "throat height TH (μm)", which is about 0.3 μm or less. An apex angle θ, which is determined according to the tilt angle of a frontward part of the insulating layer 26, lies between about 40 and 60 degrees.

The return yoke layer 27 serves so that a magnetic flux emitted from the main magnetic pole layer 22 is returned to the layer 27 after the magnetic flux has magnetized the magnetic disk 2. The return yoke layer 27 is located on the trailing side (or the side out of which the medium flows) of the main magnetic pole layer 22, and the layer 27 faces the main magnetic pole layer 22 with the gap layer 23 in between on the side close to the air bearing surface 30 and is coupled to the main magnetic pole layer 22 by the back gap 23BG on the side far away from the air bearing surface 30. For example, the return yoke layer 27 has a continuous structure extending from the air bearing surface 30 to the back gap 23BG and has a rectangular shape in plan configuration, and the layer 27 is made of a magnetic material such as Permalloy or an iron-cobalt-nickel alloy (FeCoNi).

Provided that the movement of the magnetic disk 2 traveling in the medium travel direction M (see FIGS. 3A and 3B) is a stream, the "trailing side" (or the "side out of which the medium flows") mentioned above refers to the side out of which the stream flows. In FIGS. 3A and 3B, the "trailing side" corresponds to the upward side as viewed in the direction of thickness (i.e., in the direction of the Z axis). On the other hand, the "leading side" (or the "side into which the medium flows") refers to the side into which the stream flows. In FIGS. 3A and 3B, the "leading side" corresponds to the downward side as viewed in the direction of thickness.

Next, the description is given with reference to FIGS. 3A to 5 with regard to the operation of the thin film magnetic head 10.

To record information, the thin film magnetic head 10 operates in the following manner. When an external circuit (not shown) feeds a current through the thin film coil 24 of the recording head part 10B, the thin film coil 24 generates a magnetic flux. The generated magnetic flux is contained in the auxiliary and main magnetic pole layers 18 and 22 which constitute the magnetic pole layer 29, and then the magnetic flux flows mainly through the main magnetic pole layer 22 from the rear end portion 22B to the front end portion 22A. When flowing through the main magnetic pole layer 22, the magnetic flux is narrowed and focused at the flare point FP as the width of the main magnetic pole layer 22 decreases (from W2 to W1), so that the magnetic flux converges on the front end portion 22A on the trailing side thereof. When the magnetic flux is emitted from the front end portion 22A, a magnetic field for recording is generated in a direction perpendicular to a surface of the magnetic disk 2, and the magnetic disk 2 is perpendicularly magnetized by the magnetic field for recording, so that information is magnetically recorded on the magnetic disk 2. After magnetizing the magnetic disk 2, the magnetic flux is returned to the return yoke layer 27.

To reproduce information, the thin film magnetic head 10 operates in the following manner. When a sense current is fed through the MR element 16 of the reproducing head part 10A, the resistance value of the MR element 16 changes according to a signal magnetic field for reproducing from the magnetic disk 2. Then, the resistance change is detected as a change in the sense current, so that information recorded on the magnetic disk 2 is magnetically read out.

Next, the description is given with regard to a method of manufacturing the thin film magnetic head shown in FIGS. 3A and 3B to 5.

Hereinafter, the brief description is first given with reference to FIGS. 3A and 3B to 5 with regard to the step of manufacturing the thin film magnetic head in general, and then the detailed description is given with reference to FIGS. 6A and 6B to 12A and 12B with regard to the step of forming a principal part (or, in this case, the thin film coil 24) of the thin film magnetic head 10. FIGS. 6A and 6B to 12A and 12B are of assistance in explaining the step of manufacturing the thin film coil 24. Since the detailed description has been previously given with regard to the materials, dimensions and structural features of the structural components of the thin film magnetic head 10, the description thereof is appropriately omitted.

The thin film magnetic head 10 is manufactured by forming and stacking the structural components in sequence using an existing thin film process including mainly deposition technique such as plating or sputtering, patterning technique such as photolithographic technique, and etching technique such as dry etching. More specifically, after forming the insulating layer 12 on the base 11, the reproducing head part 10A is first formed by forming the stacked structure comprising the bottom shield layer 13, the shield gap film 14 having the MR element 16 embedded therein, and the top shield layer 15, which are stacked in this sequence on the insulating layer 12. After forming the isolating layer 17 on the reproducing head part 10A, the recording head part 10B is then formed by forming the stacked structure comprising the magnetic pole layer 29 (comprising the auxiliary and main magnetic pole layers 18 and 22) around which the insulating layers 19 and 21 fill the gaps, the gap layer 23 having the back gap 23BG, the insulating layer 26 having the thin film coil 24 covered therewith, and the return yoke layer 27, which are stacked in this sequence on the isolating layer 17. After forming the overcoat layer 28 on the recording head part 10B, the air bearing surface 30 is finally formed by use of machining and polishing. The thin film magnetic head is completed through the above-mentioned procedure.

The recording head part 10B is formed in the following manner. After forming the isolating layer 17, the auxiliary magnetic pole layer 18 is first selectively formed on the isolating layer 17 by using, for example, plating so that the layer 18 is located rearward relative to the position at which the air bearing surface 30 is to be formed in the following step (see FIG. 3B). Then, the insulating layer 19 is formed through the following procedure: a precursory insulating layer made of $Al_2O_3$ is formed by using, for example, sputtering so as to cover the auxiliary magnetic pole layer 18 and the isolating layer 17 therearound; and the precursory insulating layer is polished and planarized by using, for example, CMP (chemical mechanical polishing) until at least the auxiliary magnetic pole layer 18 is exposed. In this manner, the insulating layer 19 is formed so as to fill the gap around the auxiliary magnetic pole layer 18. Then, the main magnetic pole layer 22 is formed through the following procedure: a magnetic layer (not shown) made of a magnetic material such as an iron-cobalt alloy (FeCo) or an iron-cobalt-nickel alloy (FeCoNi) is formed on the planarized surface formed of the auxiliary magnetic pole layer 18 and the insulating layer 19 by using, for example, plating or sputtering; and then the magnetic layer is patterned by using photolithographic technique or etching technique. In this manner, the main magnetic pole layer 22 is selectively formed. The main magnetic pole layer 22 is configured to include the front end portion 22A and the rear end portion 22B which are disposed in this sequence as viewed from the frontward side. In particular, the main magnetic pole layer 22 is positioned so that a neck height NH is finally about 0.3 μm or less. The magnetic pole layer 29 having the double-layer structure comprising the auxiliary magnetic pole layer 18 and the main magnetic pole layer 22 is formed in the above-mentioned manner.

Then, the insulating layer 21 is formed through the following procedure: a precursory insulating layer made of $Al_2O_3$ is formed by using, for example, sputtering so as to cover the main magnetic pole layer 22 and the insulating layer 19 therearound; and the precursory insulating layer is polished and planarized by using, for example, CMP until at least the main magnetic pole layer 22 is exposed. In this manner, the insulating layer 21 is formed so as to fill the gap around the main magnetic pole layer 22. Then, the gap layer 23 is formed with a thickness of about 0.2 μm or less on the planarized surface formed of the main magnetic pole layer 22 and the insulating layer 21 by using, for example, sputtering. The gap layer 23 is configured so as not to cover the back gap 23BG.

Then, the thin film coil 24 is formed. The detailed description will be given later with regard to the step of forming the thin film coil 24. After forming the thin film coil 24, the insulating layer 26 is formed through the following procedure: a photoresist film (not shown) is selectively formed so as to cover the thin film coil 24 and the gap layer 23 therearound; and then the photoresist film is baked. Baking imparts fluidity to the photoresist film, thus forming the insulating layer 26 having the rounded slope. The insulating layer 26 is positioned so that the throat height TH is finally about 0.3 μm or less. Finally, the return yoke layer 27 made of Permalloy or an iron-cobalt-nickel alloy (FeCoNi) is selectively formed by using, for example, plating or sputtering so as to cover the insulating layer 26 and the layers therearound. The return yoke layer 27 is configured so that its frontward part faces the magnetic pole layer 29 with the gap layer 23 in between and its rearward part is coupled to the magnetic pole layer 29 by the back gap 23BG. The recording head part 10B is completed in the above-mentioned manner.

Next, the description is given with regard to the step of forming the thin film coil 24. This step includes the step of forming the spiral first coil 24A on the gap layer 23 which acts as the substrate, the first coil 24A being wound around the axis perpendicular to the in-plane direction of the gap layer 23 in the in-plane direction thereof, the first coil 24A having the top surface 24AU having the greatest width, the top surface 24AU being the end surface opposite to the gap layer 23; the step of forming an insulating layer 24ZL so as to fill the region 51 between windings of the first coil 24A; the step of selectively etching the insulating layer 24ZL using the first coil 24A as a mask so that the side surface 24AS of the first coil 24A is covered with the insulating wall 24Z formed of a part of the insulating layer 24ZL; and the step of forming the second coil 24B so as to fill the region 51 between windings having the side surface 24AS covered with the insulating wall 24Z. The detailed description is given below with reference to FIGS. 6A and 6B to 12A and 12B. FIGS. 6A, 7A, 8A, 9A, 10A, 11A and 12A show plan views, and FIGS. 6B, 7B, 8B, 9B, 10B, 11B and 12B are partly enlarged cross-sectional views corresponding to the plan views of FIGS. 6A, 7A, 8A, 9A, 10A, 11A and 12A, respectively. For example, FIG. 6B is a cross-sectional view taken along the line VI(B)-VI(B) of FIG. 6A, viewed in the direction of the arrow of the line VI(B)-VI(B). For the sake of simplicity, in FIGS. 6A and 6B to 12A and 12B, there are not shown the structural components having no direct relation to the formation of the thin film coil 24, excluding the main magnetic pole layer 22 and the gap layer 23.

Figure 6A:
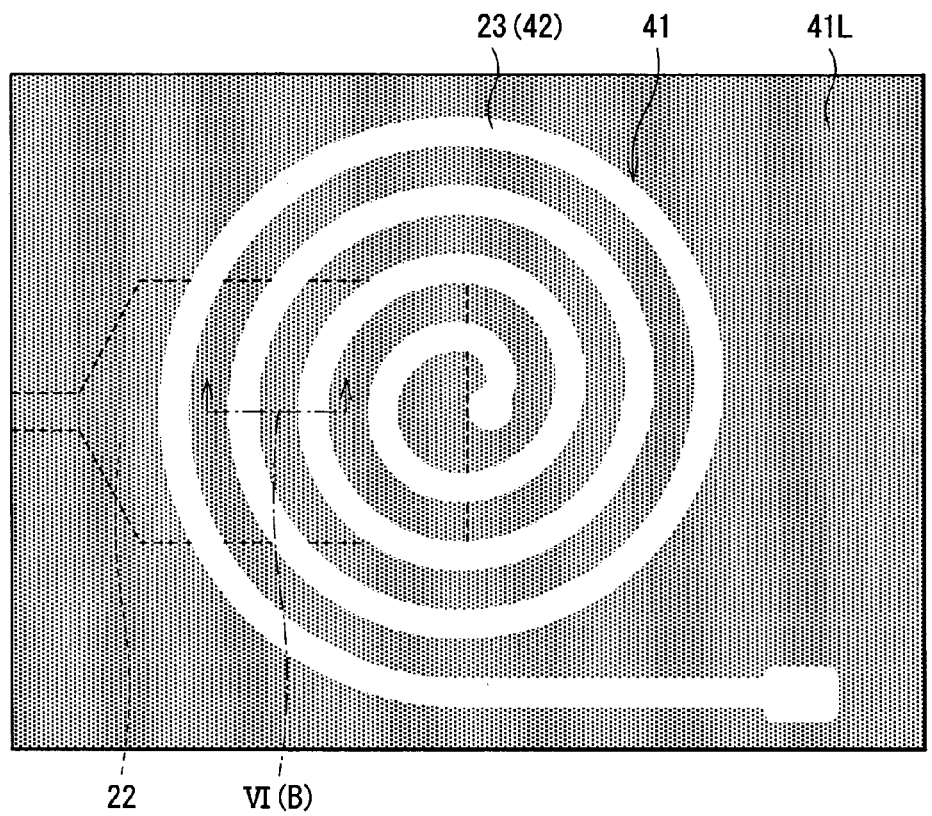
FIGS. 6A and 6B are a plan view and a cross-sectional view, respectively, of assistance in explaining one step of manufacturing the thin film magnetic head shown in FIGS. 3A to 5.
Figure 6B:
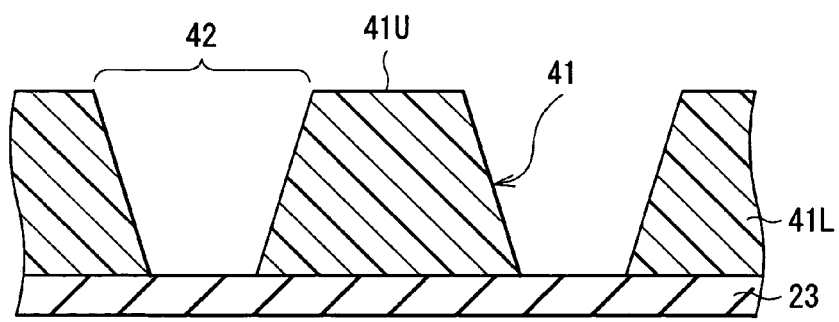
Figure 7A:
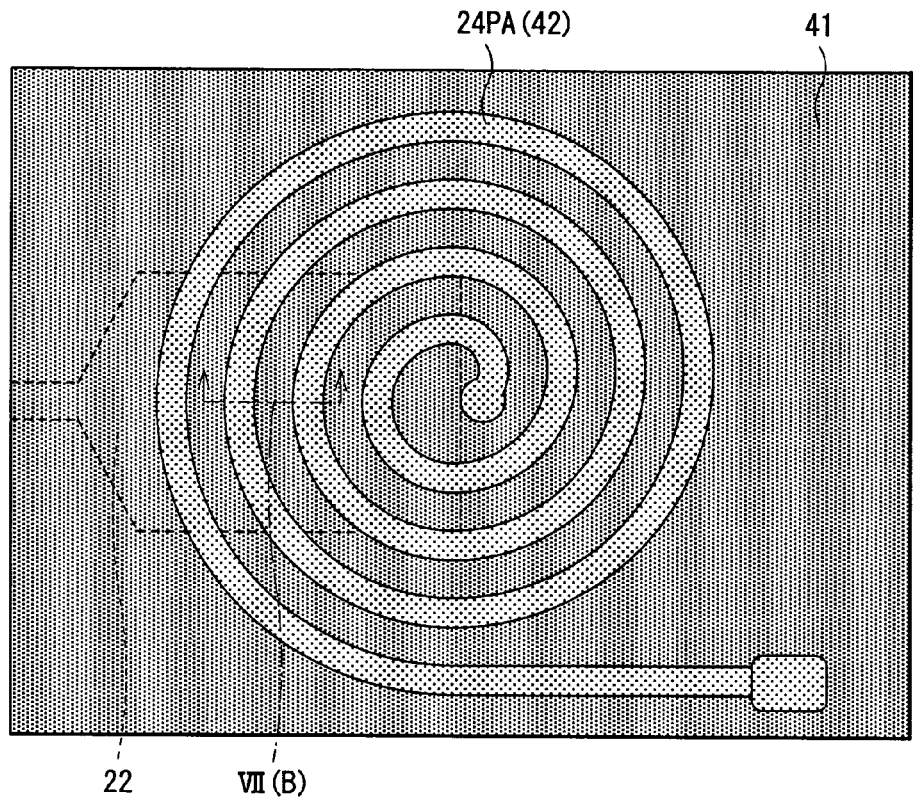
FIGS. 7A and 7B are a plan view and a cross-sectional view, respectively, of assistance in explaining a step following the step of FIGS. 6A and 6B.
Figure 7B:
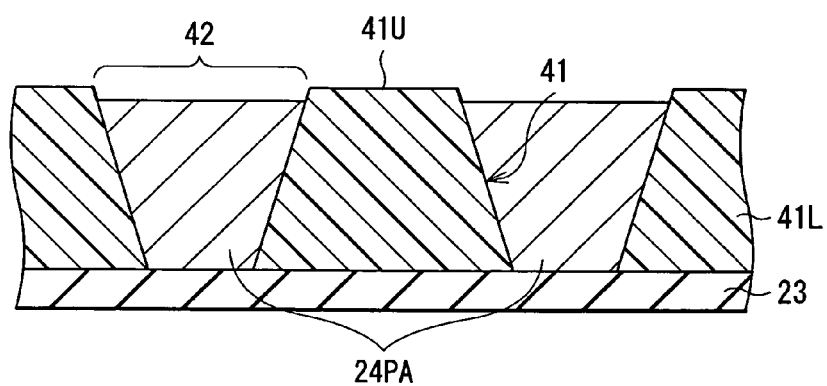

As shown in FIGS. 6A and 6B, a resist layer 41L having a spiral pattern 41 is first selectively formed on the gap layer 23 covered with a plating underlayer (not shown) by using photolithography or the like. The spiral pattern 41 has a cross-sectional configuration in which a top surface 41U which is an end surface opposite to the gap layer 23 has the smallest width as viewed in the in-plane direction thereof (see FIG. 6B). Desirably, the spiral pattern 41 has a progressively smaller width farther away from the gap layer 23, as viewed in the in-plane direction thereof. A region not having the resist layer 41L is a spiral groove 42 of the spiral pattern 41. As shown in FIGS. 7A and 7B, a first coil pattern 24PA is then formed so as to fill the spiral groove 42, for example by means of plating with copper or the like using the plating underlayer.

Figure 8A:
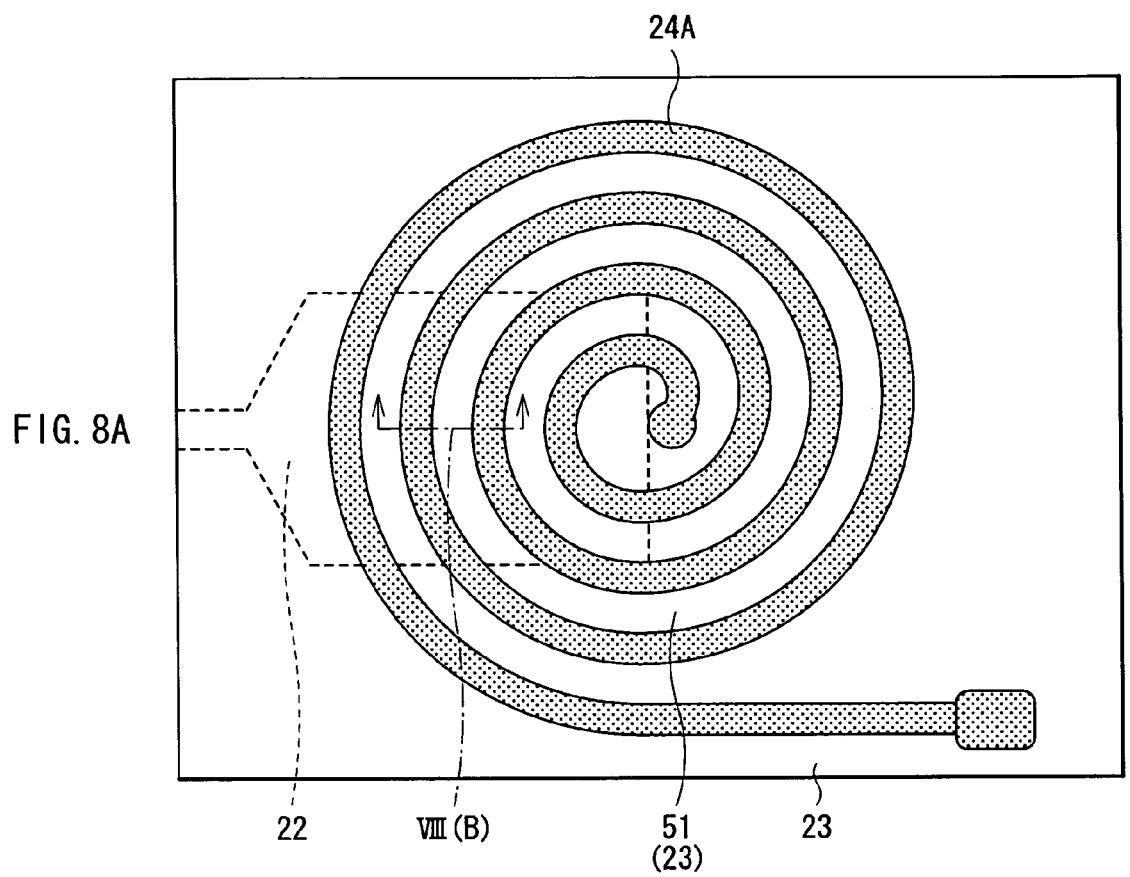
FIGS. 8A and 8B are a plan view and a cross-sectional view, respectively, of assistance in explaining a step following the step of FIGS. 7A and 7B.
Figure 8B:
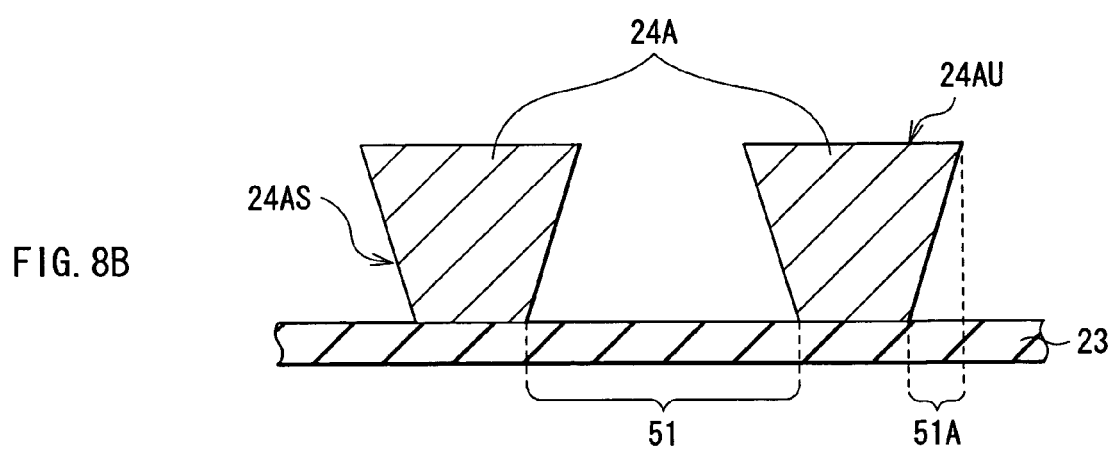
Figure 9A:
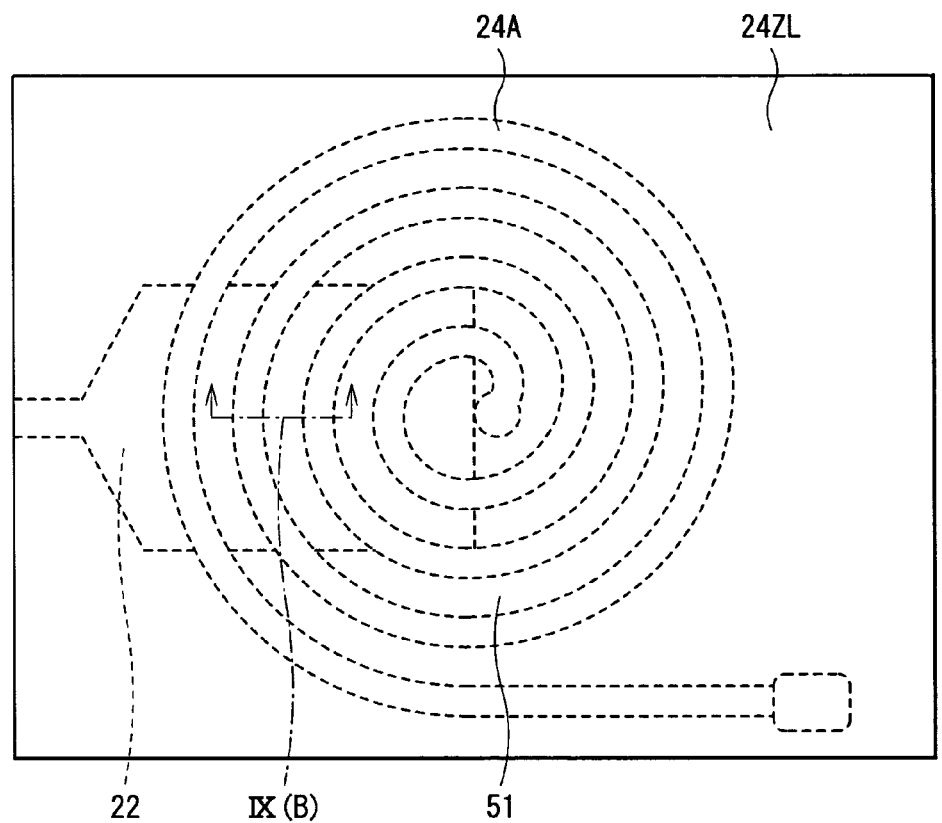
FIGS. 9A and 9B are a plan view and a cross-sectional view, respectively, of assistance in explaining a step following the step of FIGS. 8A and 8B.
Figure 9B:
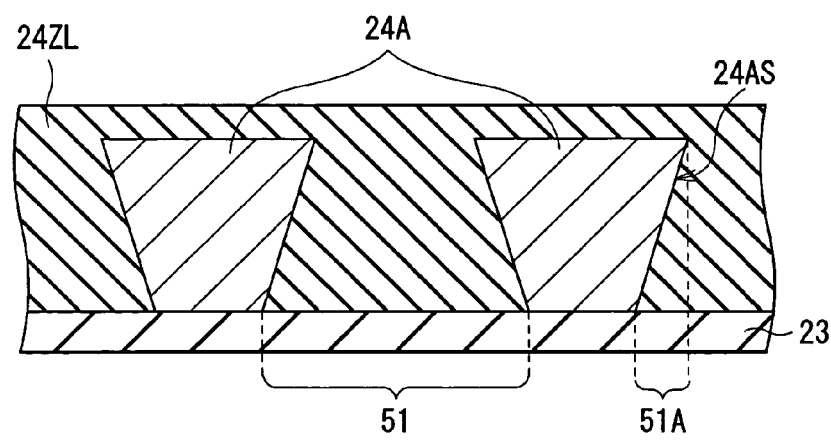

As shown in FIGS. 8A and 8B, the first coil 24A and the region 51 between windings are then formed through the following procedure: the resist layer 41L is removed; and then the plating underlayer (not shown) exposed through the removal of the layer 41L is removed by using ion milling or the like. In this case, the first coil 24A has the top surface 24AU having the greatest width, and the region 51 between windings is a gap region between windings of the first coil 24A. When the preceding step involves forming the resist layer 41L so that the spiral pattern 41 has a progressively smaller width farther away from the gap layer 23 as viewed in the in-plane direction thereof, the first coil 24A has the shape of an inverted trapezoid in cross section as viewed in the direction of thickness thereof, so that the overhang region 51A is formed (see FIG. 8B). As shown in FIGS. 9A and 9B, the insulating layer 24ZL is then formed so as to fill the region 51 between windings. Preferably, the insulating layer 24ZL is formed with a thickness equal to or greater than the thickness of the first coil 24A (or the depth of the region 51 between windings), because the insulating layer 24ZL of such a thickness can completely cover the side surface 24AS of the first coil 24A. For example, a material to which heating imparts fluidity, such as a resist, is used to form the insulating layer 24ZL. More specifically, the overall surface is coated with the resist, and then the resist is baked to shrink so that each side surface 24AS is fully covered with the resist. Alternatively, spin on glass (SOG) may be used to form the insulating layer 24ZL.

Figure 10A:
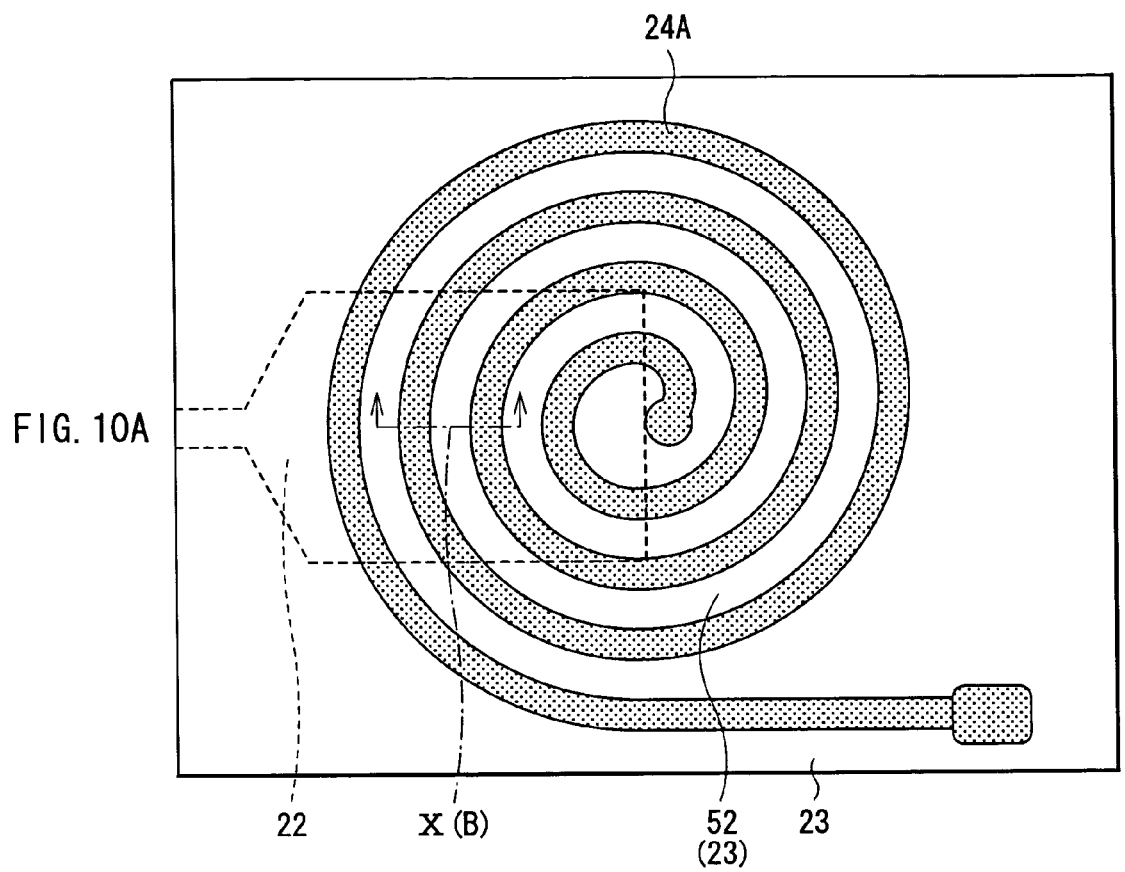
FIGS. 10A and 10B are a plan view and a cross-sectional view, respectively, of assistance in explaining a step following the step of FIGS. 9A and 9B.
Figure 10B:
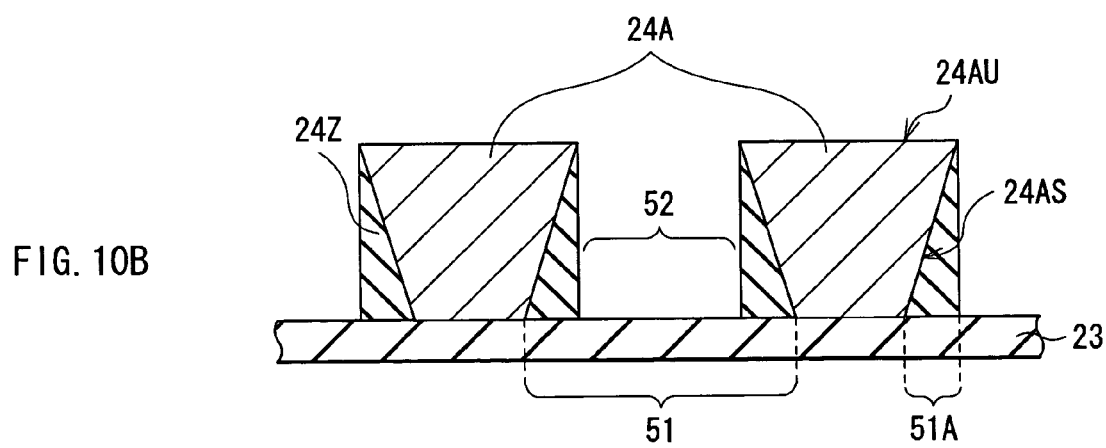

After the formation of the first coil 24A, the insulating layer 24ZL is selectively etched by means of reactive ion etching (RIE) or the like using the first coil 24A as a mask, as shown in FIGS. 10A and 10B. This etching allows a part of the insulating layer 24ZL to remain in the overhang region 51A which is in the shade of the top surface 24AU, thus forming the insulating wall 24Z which covers the side surface 24AS. The etching also allows the gap layer 23 to be exposed, thus forming an inner region 52. In FIGS. 10A and 10B, there is shown an example in which etching takes place in the direction perpendicular to the in-plane direction of the gap layer 23. However, an etching angle is not limited to this example, and a desired angle can be selected as the etching angle.

Figure 11A:
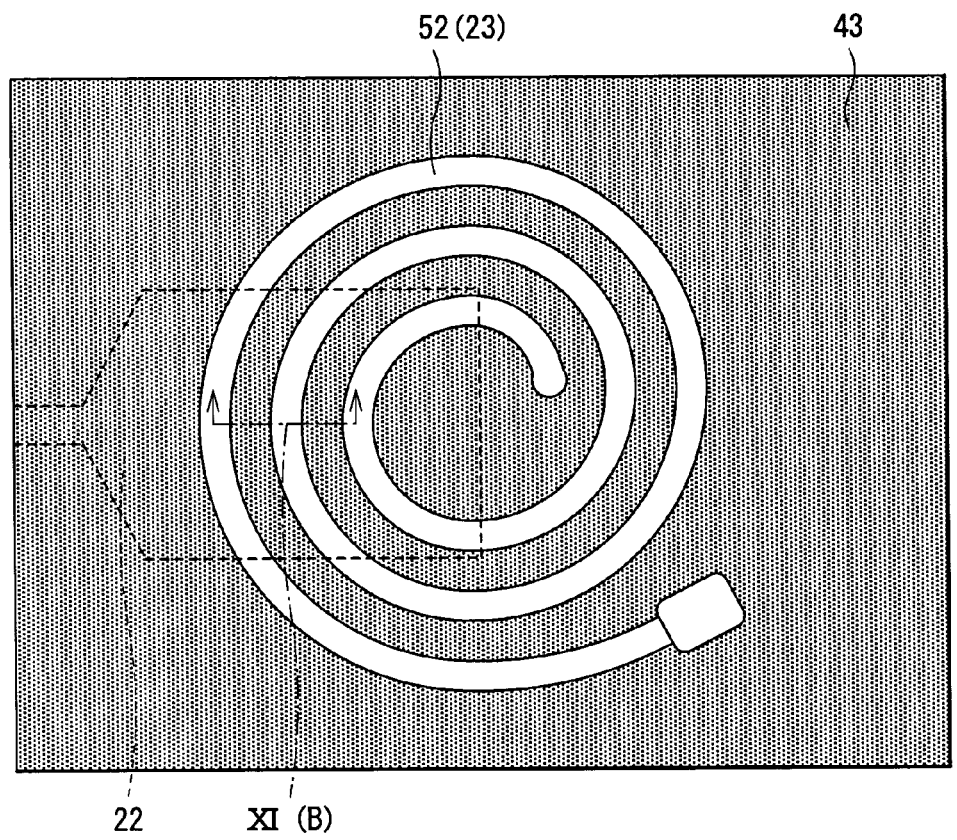
FIGS. 11A and 11B are a plan view and a cross-sectional view, respectively, of assistance in explaining a step following the step of FIGS. 10A and 10B.
Figure 11B:
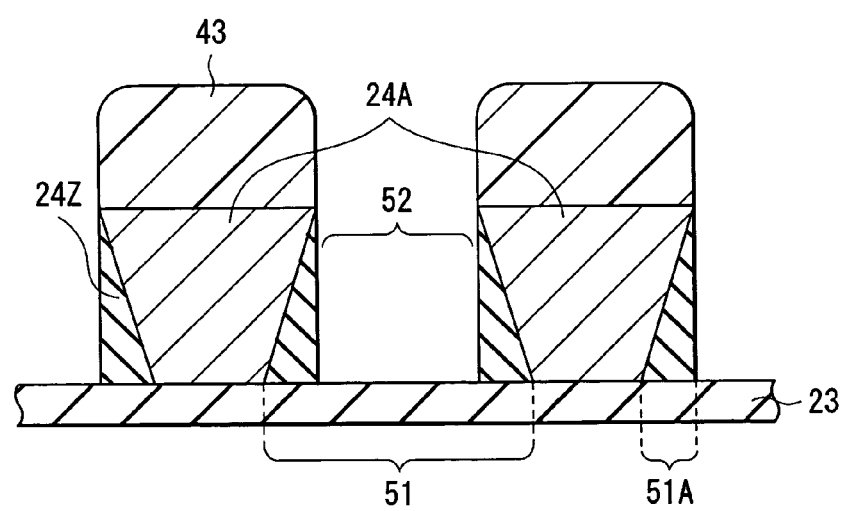
Figure 12A:
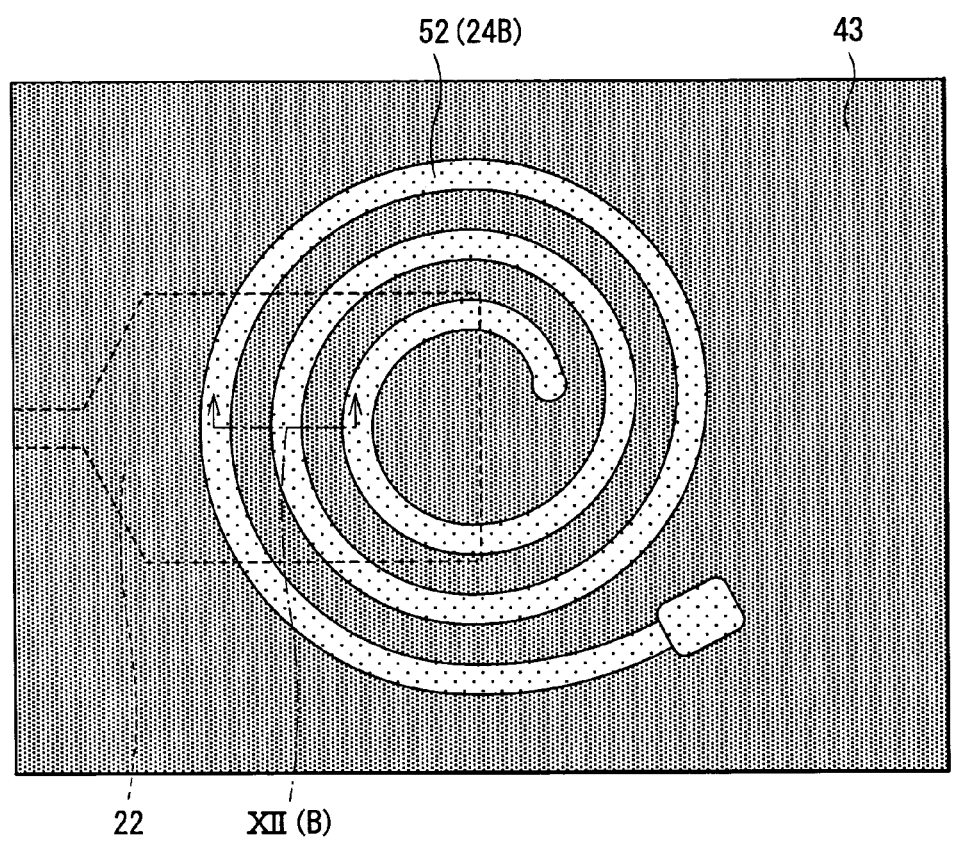
FIGS. 12A and 12B are a plan view and a cross-sectional view, respectively, of assistance in explaining a step following the step of FIGS. 11A and 11B.
Figure 12B:
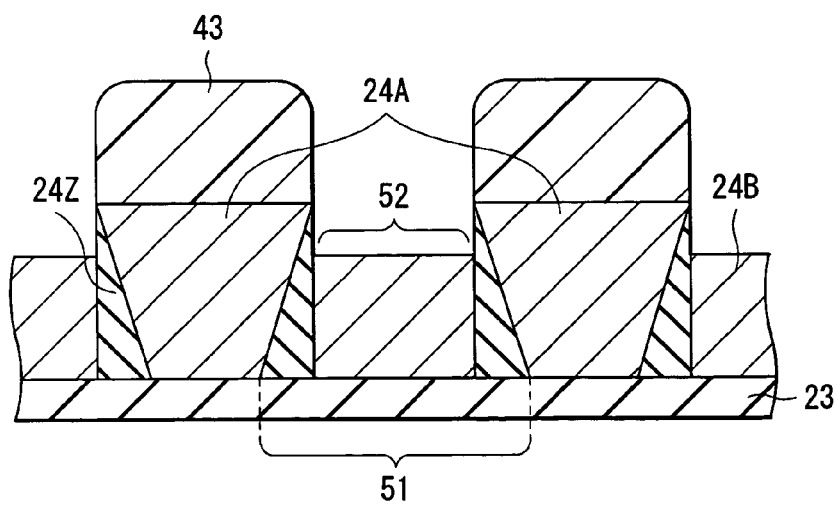
Figure 13A:
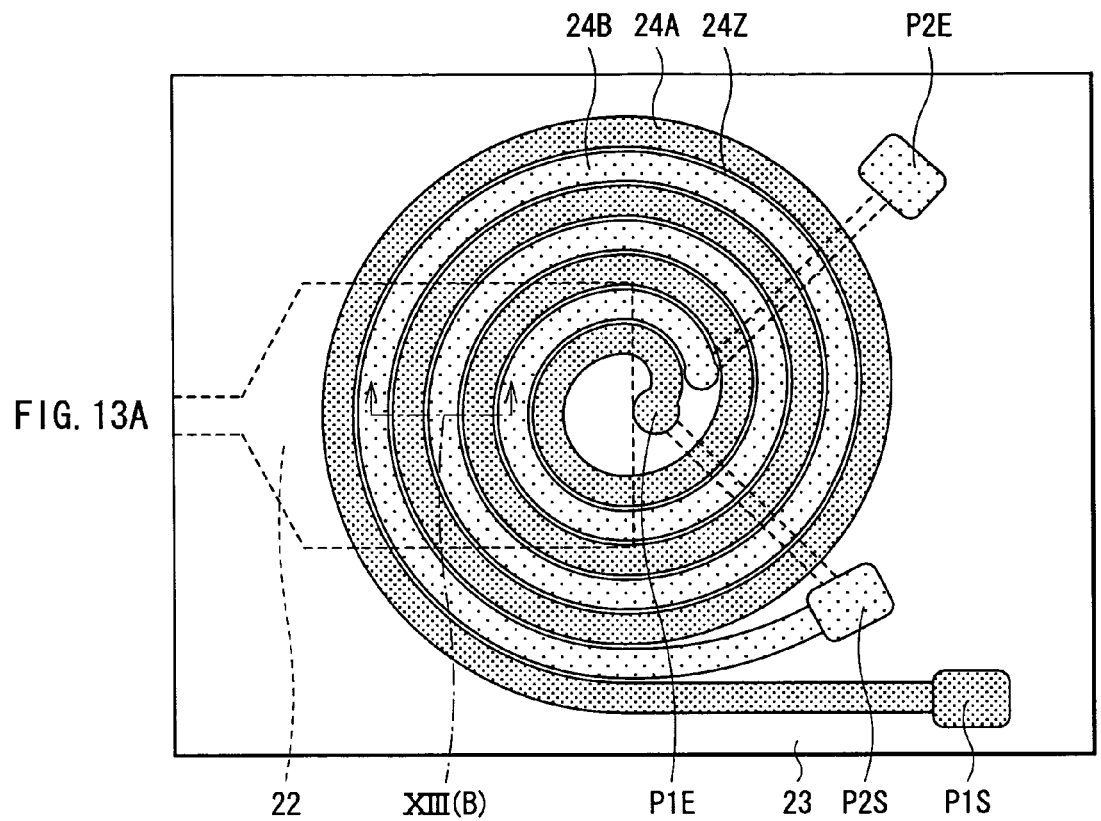
FIGS. 13A and 13B are a plan view and a cross-sectional view, respectively, of assistance in explaining a step following the step of FIGS. 12A and 12B.
Figure 13B:
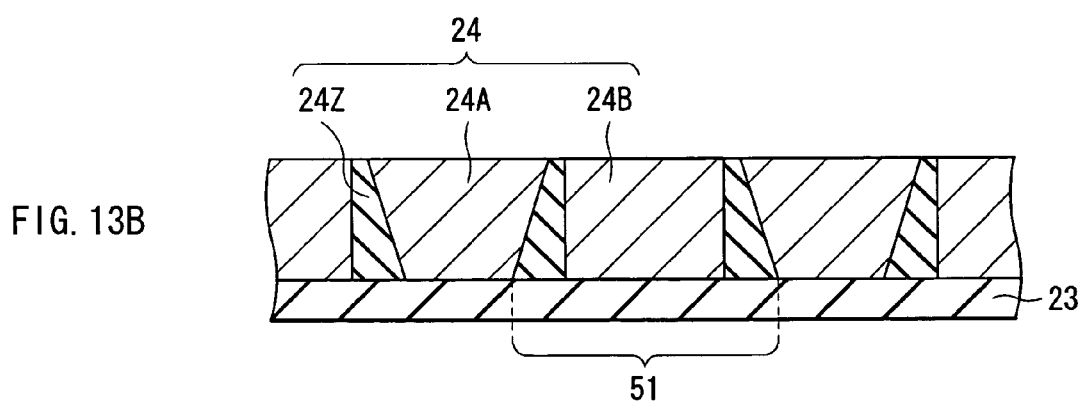

After the selective etching of the insulating layer 24ZL, a resist pattern 43 is selectively formed so that the inner region 52 remains, as shown in FIGS. 11A and 11B. As shown in FIGS. 12A and 12B, the second coil 24B is then formed so as to fill the inner region 52 which is not protected by the resist pattern 43. In particular when the second coil 24B is formed so that the thickness of the second coil 24B is less than the thickness of the first coil 24A, this configuration can ensure insulation between the respective side surfaces of the first and second coils 24A and 24B with higher reliability. Finally, as shown in FIGS. 13A and 13B, the overall surface is polished by using CMP or the like until at least the first coil 24A is exposed, and thus the first coil 24A is isolated from the second coil 24B by the insulating wall 24Z. In this case, further planarization takes place using CMP or the like so that the first and second coils 24A and 24B have a uniform thickness. Such planarization permits forming other layers on the coils with ease and high accuracy. Then, one end P1E of the first coil 24A is coupled to one end P2S of the second coil 24B, and thus the thin film coil 24 comprising a series of the first and second coils 24A and 24B integral with each other is completed. Incidentally, both ends P1S and P2E of the thin film coil 24 are connected to a driving circuit (not shown).

As described above, the method according to the first embodiment includes forming the spiral first coil 24A having the top surface 24AU having the greatest width, the top surface 24AU being the end surface opposite to the gap layer 23; previously forming the insulating layer 24ZL so as to fill the region 51 between windings of the first coil 24A; and then selectively etching the insulating layer 24ZL using the first coil 24A as the mask. Thus, the method of the first embodiment can facilitate forming the insulating wall 24Z which covers the side surface 24AS of the first coil 24A, because of slight influence of uncertainties such as variations in surface properties of the first coil and non-uniformity in the tilt angles of the side surfaces of the first coil, as compared to a conventional method which includes depositing an insulating film around the first coil by using sputtering or the like. Therefore, the method of the first embodiment enables forming the thin film coil in a narrower space, while ensuring electrical insulation between the windings of the first and second coils 24A and 24B. The method using a fluidic resist or SOG to form the insulating wall, in particular, can achieve electrical insulation between the windings of the first and second coils 24A and 24B with greater ease. Accordingly, the thin film magnetic head including the thin film coil of the first embodiment can ensure stable recording characteristics, while coping with a higher recording density.

Second Embodiment

Next, the description is given with regard to a second embodiment of the invention. A thin film coil and a thin film magnetic head according to the second embodiment have the same structures as the thin film coil and the thin film magnetic head according to the above-described first embodiment shown in FIGS. 1 to 5, and the second embodiment is different from the first embodiment only in the forming method (and the manufacturing method). Hereinafter, the description is therefore given with regard to only a method of forming a thin film coil according to the second embodiment.

The thin film coil of the second embodiment is formed by using so-called damascene technique, as distinct from the thin film coil of the above-described first embodiment. The detailed description is given below with reference to FIGS. 14A and 14B to 21A and 21B with regard to the method of forming a thin film coil according to the second embodiment.

Figure 14A:
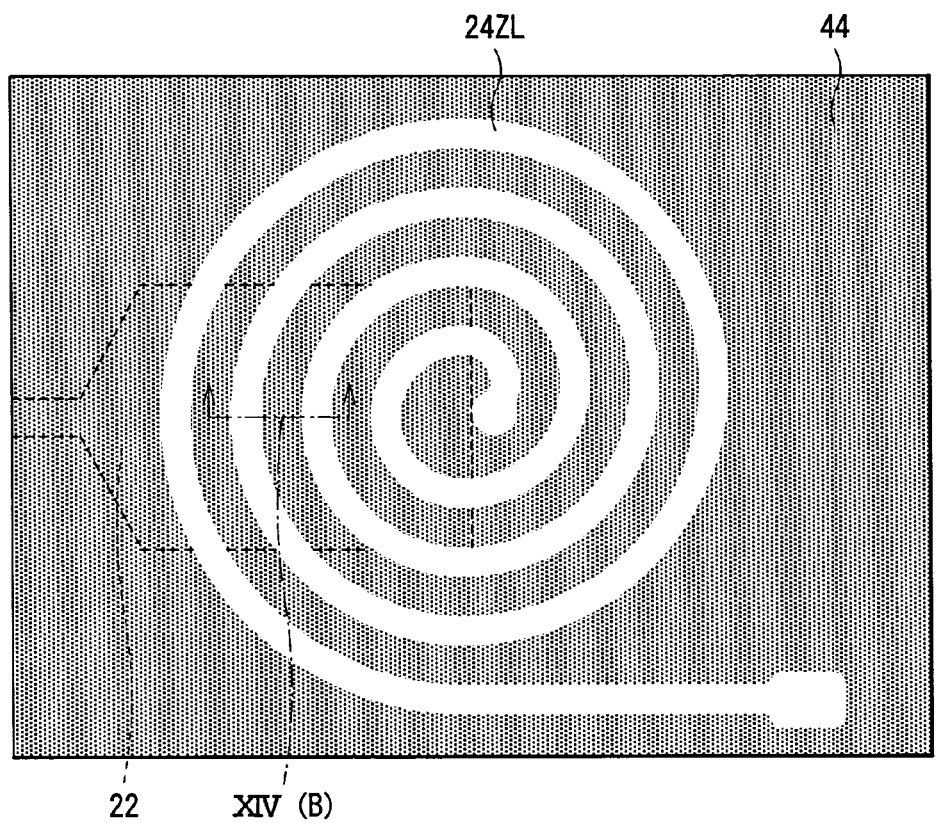
FIGS. 14A and 14B are a plan view and a cross-sectional view, respectively, of assistance in explaining another step of manufacturing the thin film magnetic head shown in FIGS. 3A and 3B to 5.
Figure 14B:
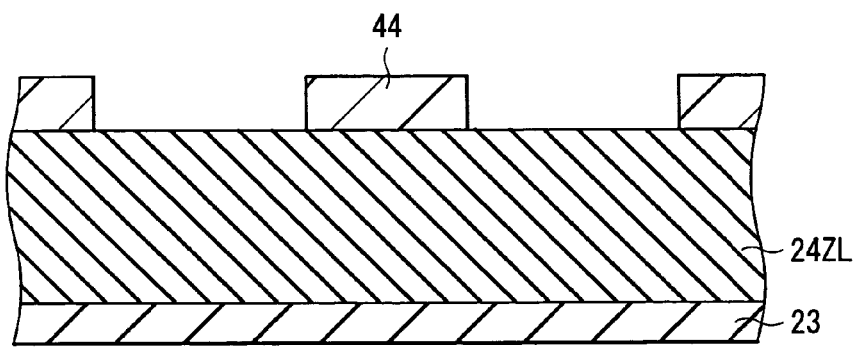
Figure 15A:
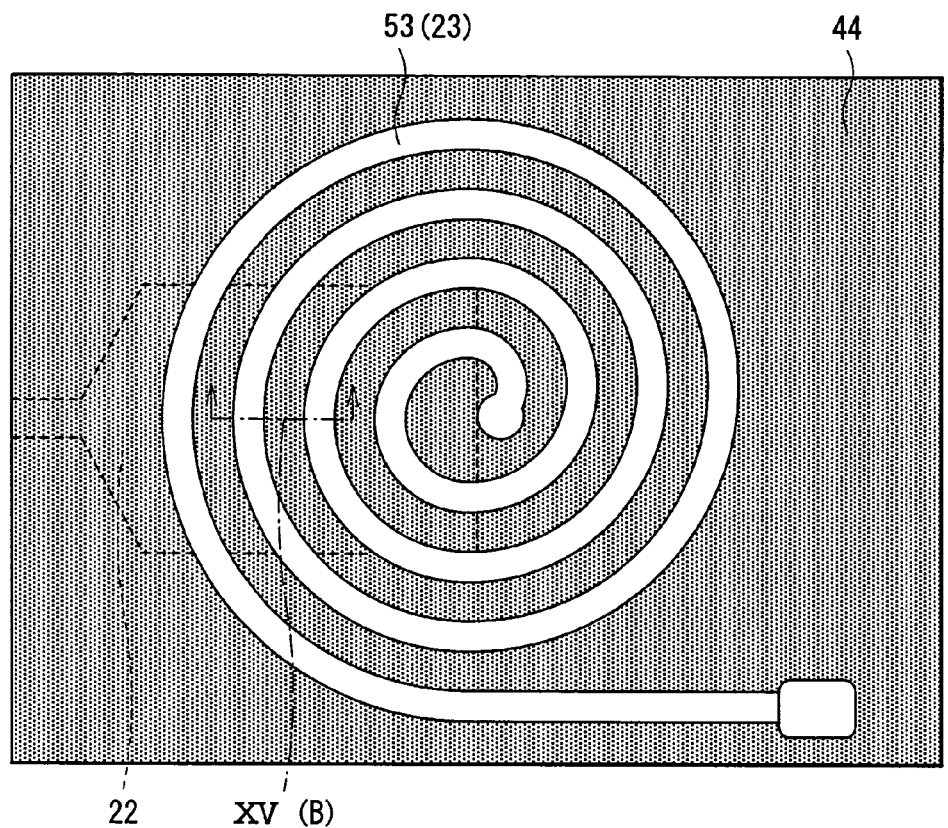
FIGS. 15A and 15B are a plan view and a cross-sectional view, respectively, of assistance in explaining a step following the step of FIGS. 14A and 14B.
Figure 15B:
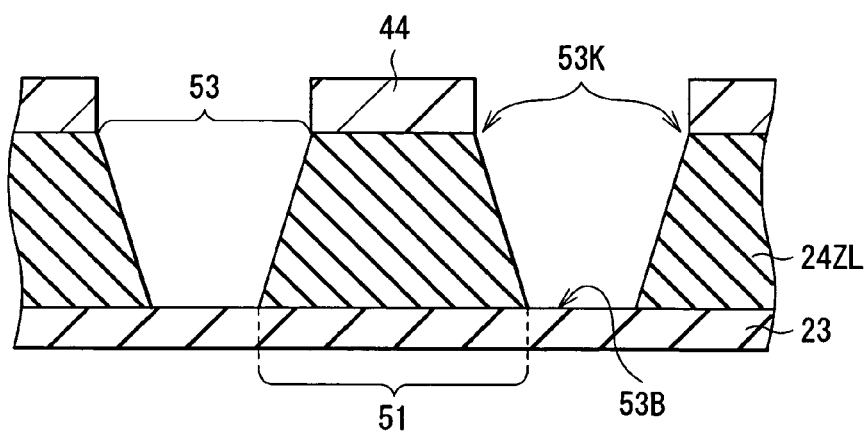

As shown in FIGS. 14A and 14B, the insulating layer 24ZL made of $Al_2O_3$ or the like is first formed on the overall surface on the gap layer 23 which acts as the substrate. A spiral resist pattern 44, which is wound around the axis perpendicular to the in-plane direction of the gap layer 23 in the in-plane direction thereof, is then selectively formed. Then, the insulating layer 24ZL is selectively etched using the resist pattern 44 as a mask. As shown in FIGS. 15A and 15B, this etching results in a spiral groove 53 having an opened end 53K having the greatest width, and the opened end 53K is located opposite to the gap layer 23. Desirably, the spiral groove 53 has a progressively greater width farther away from the gap layer 23, as viewed in the in-plane direction thereof (see FIG. 15B). More specifically, it is desirable that the spiral groove 53 have the minimum width at a bottom 53B, a progressively greater width closer to the opened end 53K, and the maximum width at the opened end 53K. A region in which the insulating layer 24ZL does not undergo etching and thus remains is the region 51 between windings.

Figure 16A:
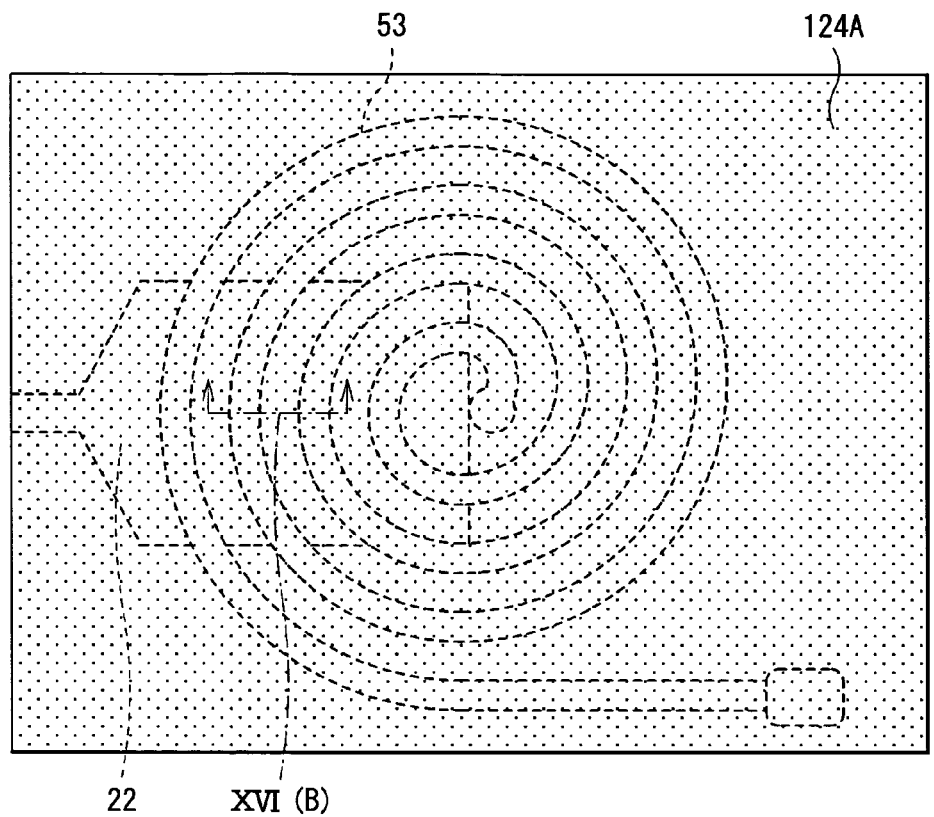
FIGS. 16A and 16B are a plan view and a cross-sectional view, respectively, of assistance in explaining a step following the step of FIGS. 15A and 15B.
Figure 16B:
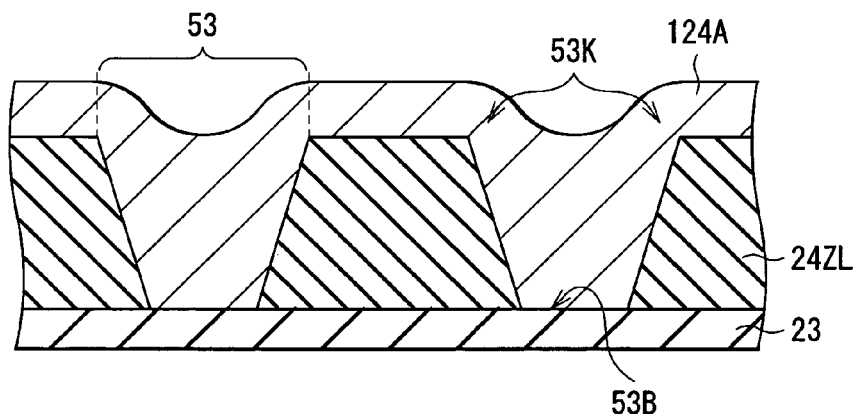
Figure 17A:
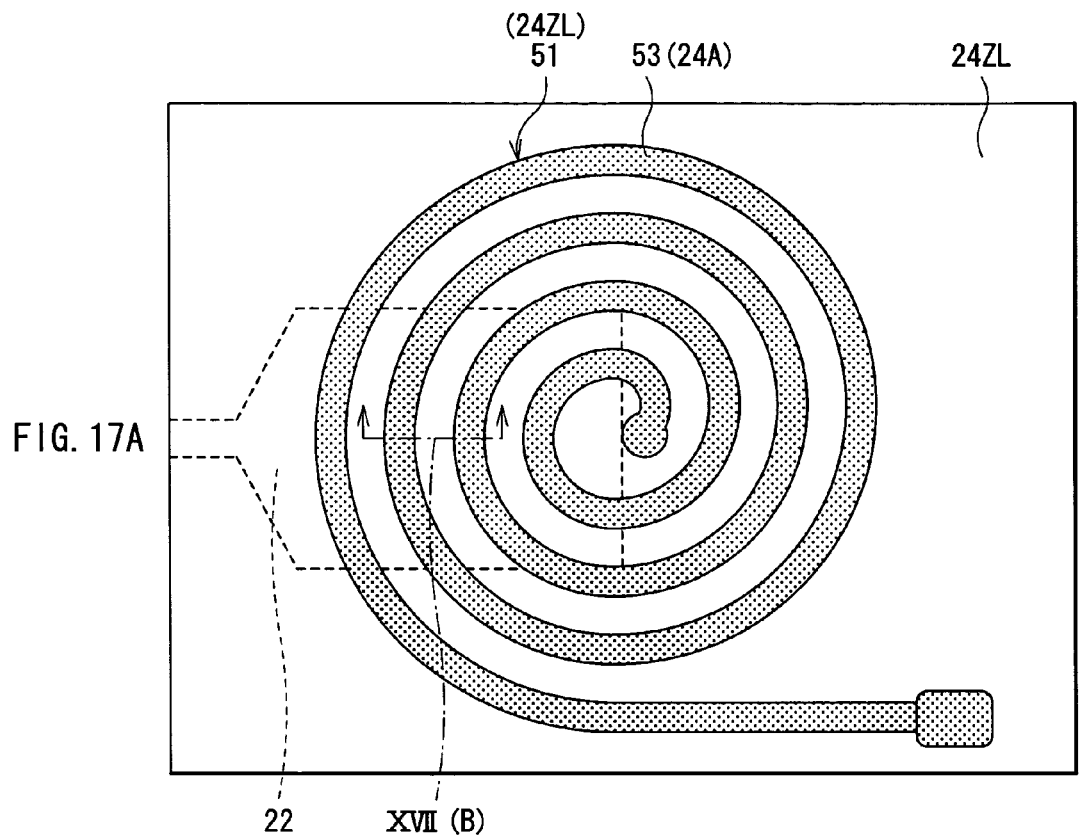
FIGS. 17A and 17B are a plan view and a cross-sectional view, respectively, of assistance in explaining a step following the step of FIGS. 16A and 16B.
Figure 17B:
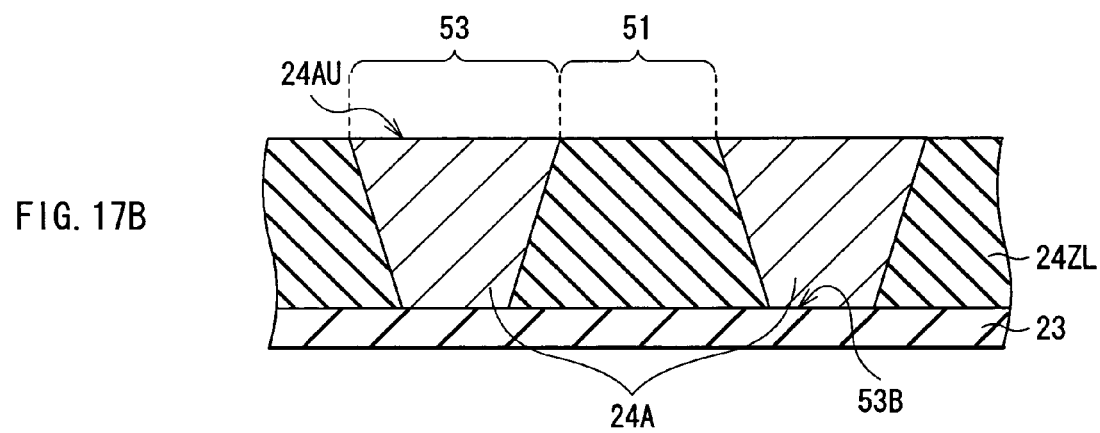

After the formation of the spiral groove 53, as shown in FIGS. 16A and 16B, the resist pattern 44 is removed, and a conductive film 124A is formed on the overall surface by using, for example, sputtering so as to fill at least the spiral groove 53. Other vacuum deposition, such as chemical vapor deposition, or plating may be used to form the conductive film 124A. As shown in FIGS. 17A and 17B, planarization then takes place using, for example, CMP, thereby forming a planarized surface containing the top surface 24AU of the first coil 24A covered with the insulating layer 24ZL. The first coil 24A is configured so that the top surface 24AU opposite to the gap layer 23 has the maximum width. When the spiral groove 53 has a progressively greater width farther away from the gap layer 23 as viewed in the in-plane direction thereof, the first coil 24A has the shape of an inverted trapezoid in cross section as viewed in the direction of thickness thereof.

Figure 18A:
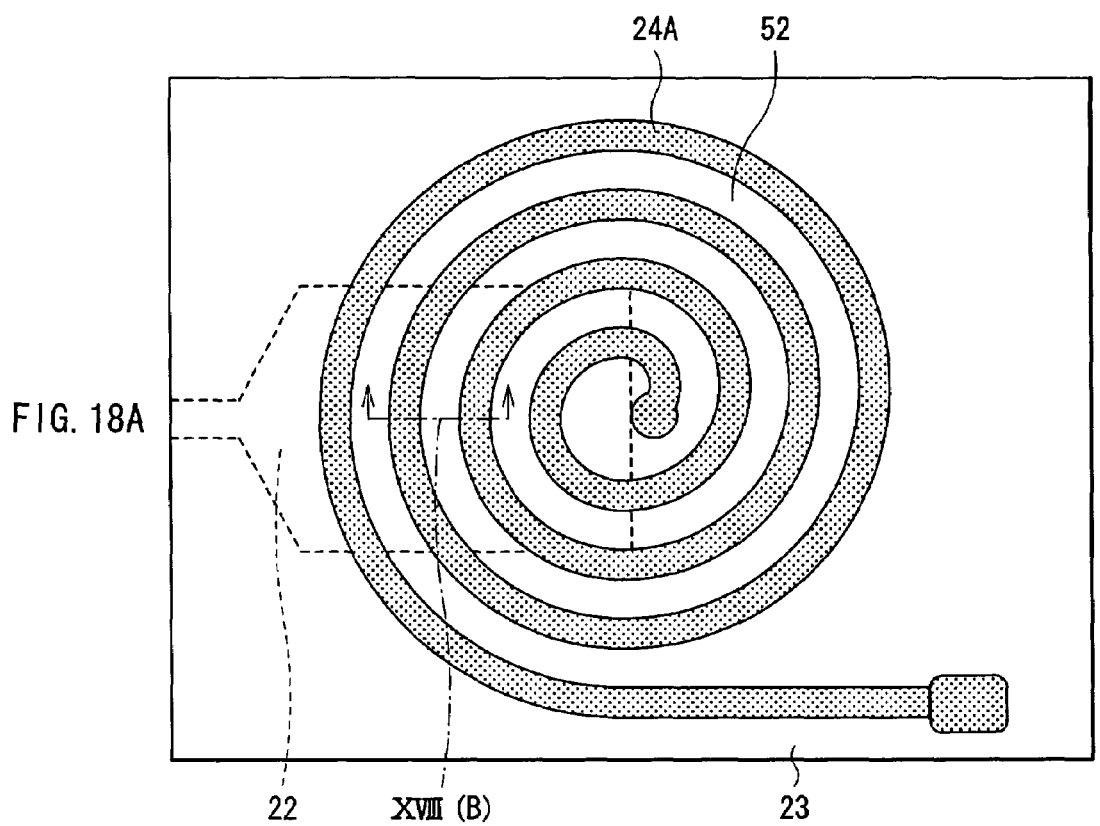
FIGS. 18A and 18B are a plan view and a cross-sectional view, respectively, of assistance in explaining a step following the step of FIGS. 17A and 17B.
Figure 18B:
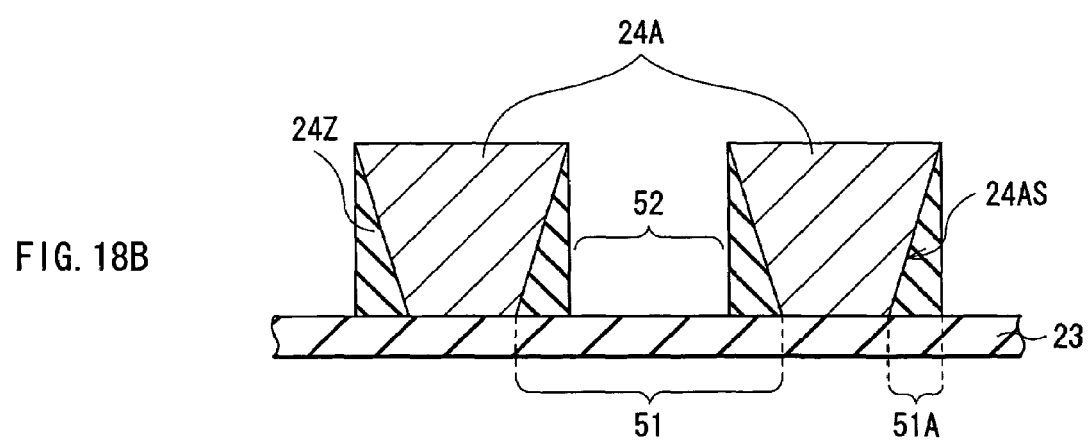

After the formation of the first coil 24A, the insulating layer 24ZL is selectively etched by means of RIE or the like using the first coil 24A as a mask, as shown in FIGS. 18A and 18B. This etching allows a part of the insulating layer 24ZL to remain in the overhang region 51A which is in the shade of the top surface 24AU, thus forming the insulating wall 24Z which covers the side surface 24AS. The etching also allows the gap layer 23 to be exposed, thus forming the inner region 52. In FIGS. 18A and 18B, there is shown an example in which etching takes place in the direction perpendicular to the in-plane direction of the gap layer 23. However, an etching angle is not limited to this example, and a desired angle can be selected as the etching angle.

Figure 19A:
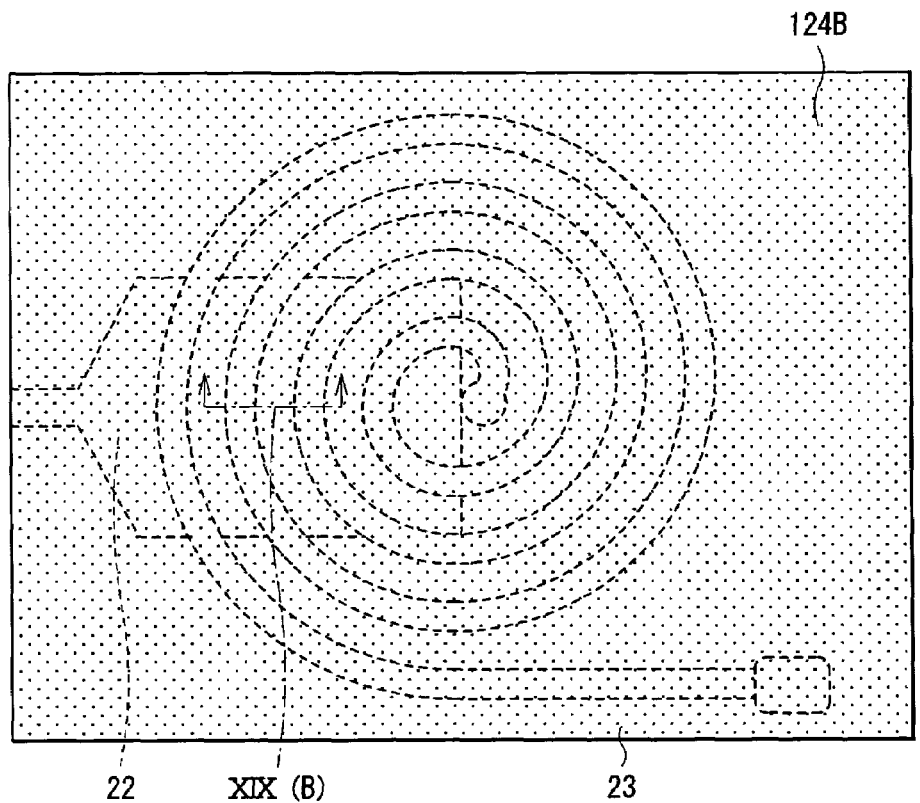
FIGS. 19A and 19B are a plan view and a cross-sectional view, respectively, of assistance in explaining a step following the step of FIGS. 18A and 18B.
Figure 19B:
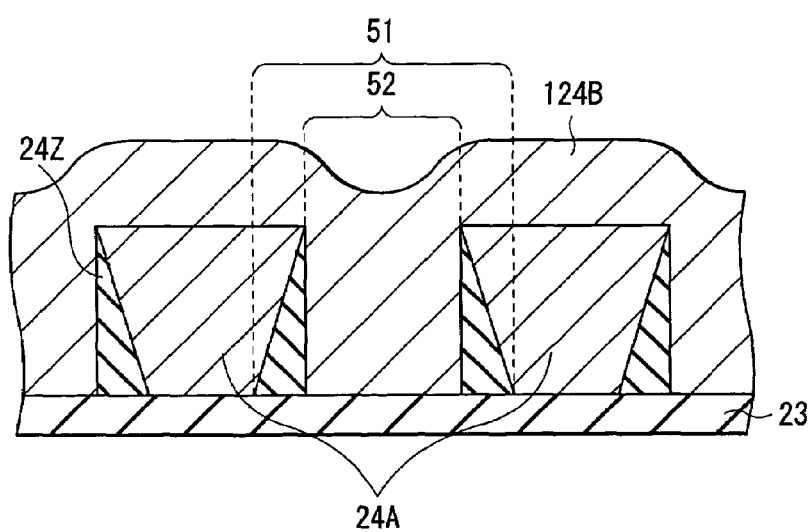
Figure 20A:
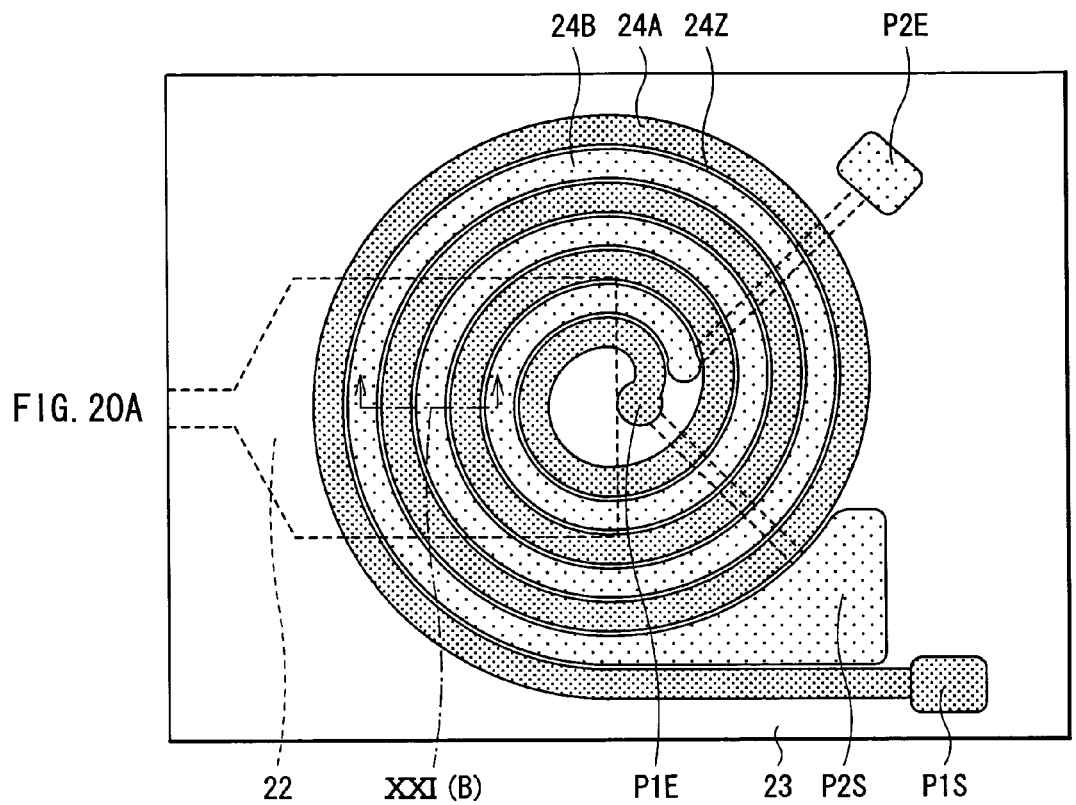
FIGS. 20A and 20B are a plan view and a cross-sectional view, respectively, of assistance in explaining a step following the step of FIGS. 19A and 19B.
Figure 20B:
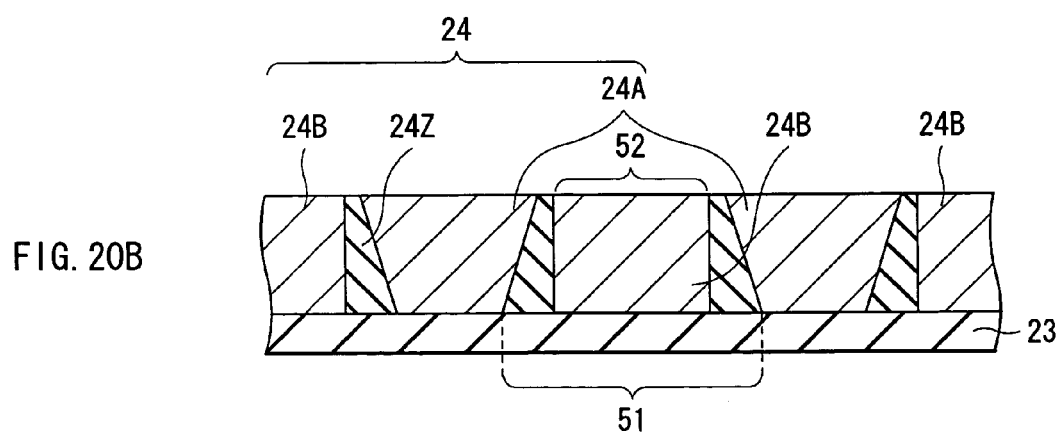

After the selective etching of the insulating layer 24ZL, a resist pattern (not shown) is selectively formed so that at least the inner region 52 remains. As shown in FIGS. 19A and 19B, a conductive film 124B is then formed on the overall surface so as to fill at least the region 51 between windings having the side surface 24AS covered with the insulating wall 24Z, namely, at least the inner region 52. As shown in FIGS. 20A and 20B, the first and second coils 24A and 24B, which are isolated from each other by the insulating wall 24Z and have a uniform thickness, are finally formed by subjecting the overall surface to polishing and planarization using CMP or the like until at least the first coil 24A is exposed. Then, one end P1E of the first coil 24A is coupled to one end P2S of the second coil 24B, and thus the thin film coil 24 comprising a series of the first and second coils 24A and 24B integral with each other is completed. Incidentally, both ends P1S and P2E of the thin film coil 24 are connected to a driving circuit (not shown).

As described above, the method according to the second embodiment uses damascene technique to perform the process which includes previously forming the spiral groove 53 having the opened end 53K having the maximum width on the insulating layer 24ZL, the opened end 53K being located opposite to the gap layer 23; then forming the first coil 24A having the top surface 24AU having the maximum width so as to fill the spiral groove 53; and then selectively etching the insulating layer 24ZL using the first coil 24A as the mask. Thus, the method of the second embodiment can facilitate and ensure forming the insulating wall 24Z which covers the side surface 24AS of the first coil 24A, because of little influence of uncertainties such as variations in surface properties of the first coil and non-uniformity in the tilt angles of the side surfaces of the first coil, as compared to the conventional method which includes depositing an insulating film around the first coil by using sputtering or the like. Therefore, the method of the second embodiment enables forming the thin film coil in a narrower space, while ensuring sufficient electrical insulation between the windings of the first and second coils 24A and 24B. Accordingly, the thin film magnetic head including the thin film coil of the second embodiment can ensure stable recording characteristics, while coping with a higher recording density.

Third Embodiment

Next, the description is given with regard to a third embodiment of the invention. A thin film coil and a thin film magnetic head according to the third embodiment have the same structures as the thin film coil and the thin film magnetic head according to the above-described first embodiment shown in FIGS. 1 to 5, and the third embodiment is different from the first embodiment only in the forming method (and the manufacturing method). Hereinafter, the description is therefore given with regard to only a method of forming a thin film coil according to the third embodiment.

The thin film coil of the third embodiment comprises the first coil formed by the method using mainly photolithography as described in the above-mentioned first embodiment, and the second coil formed by damascene technique as described in the above-mentioned second embodiment. The description is given step by step below with reference to FIGS. 6A and 6B to 10A and 10B and FIGS. 19A and 19B to 20A and 20B with regard to the method of forming a thin film coil according to the third embodiment.

As shown in FIGS. 6A and 6B, the resist layer 41L having the spiral pattern 41 is first selectively formed on the gap layer 23 covered with a plating underlayer (not shown) by using photolithography or the like. The spiral pattern 41 is configured so that the top surface 41U which is the end surface opposite to the gap layer 23 has the smallest width as viewed in the in-plane direction thereof. Desirably, the spiral pattern 41 has a progressively smaller width farther away from the gap layer 23, as viewed in the in-plane direction thereof. The region not having the resist layer 41L is the spiral groove 42 of the spiral pattern 41. As shown in FIGS. 7A and 7B, the first coil pattern 24PA is then formed so as to fill the spiral groove 42, for example by means of plating with copper or the like using the plating underlayer.

As shown in FIGS. 8A and 8B, the first coil 24A and the region 51 between windings are then formed through the following procedure: the resist layer 41L is removed; and then the plating underlayer (not shown) exposed through the removal of the layer 41L is removed by using ion milling or the like. In this case, the first coil 24A has the top surface 24AU having the greatest width, and the region 51 between windings is the gap region between windings of the first coil 24A. When the preceding step involves forming the resist layer 41L so that the spiral pattern 41 has a progressively smaller width farther away from the gap layer 23 as viewed in the in-plane direction thereof, the first coil 24A has the shape of an inverted trapezoid in cross section as viewed in the direction of thickness thereof, so that the overhang region 51A is formed. As shown in FIGS. 9A and 9B, the insulating layer 24ZL is then formed so as to fill the region 51 between windings. Preferably, the insulating layer 24ZL is formed with a thickness equal to or greater than the thickness of the first coil 24A (or the depth of the region 51 between windings), because the insulating layer 24ZL of such a thickness can completely cover the side surface 24AS of the first coil 24A. For example, a material to which heating imparts fluidity, such as a resist, is used to form the insulating layer 24ZL. More specifically, the overall surface is coated with the resist, and then the resist is baked to shrink so that each side surface 24AS is fully covered with the resist. Alternatively, spin on glass (SOG) may be used to form the insulating layer 24ZL.

After the formation of the first coil 24A, the insulating layer 24ZL is selectively etched by means of RIE or the like using the first coil 24A as a mask, as shown in FIGS. 10A and 10B. This etching allows a part of the insulating layer 24ZL to remain in the overhang region 51A which is in the shade of the top surface 24AU, thus forming the insulating wall 24Z which covers the side surface 24AS. The etching also allows the gap layer 23 to be exposed, thus forming the inner region 52. In FIGS. 10A and 10B, there is shown the example in which etching takes place in the direction perpendicular to the in-plane direction of the gap layer 23. However, an etching angle is not limited to this example, and a desired angle can be selected as the etching angle.

After the selective etching of the insulating layer 24ZL, a resist pattern (not shown) is selectively formed so that at least the inner region 52 remains. As shown in FIGS. 19A and 19B, the conductive film 124B is then formed on the overall surface so as to fill at least the region 51 between windings having the side surface 24AS covered with the insulating wall 24Z, namely, at least the inner region 52. As shown in FIGS. 20A and 20B, the first and second coils 24A and 24B, which are isolated from each other by the insulating wall 24Z and have a uniform thickness, are finally formed by subjecting the overall surface to polishing and planarization using CMP or the like until at least the first coil 24A is exposed. Then, one end P1E of the first coil 24A is coupled to one end P2S of the second coil 24B, and thus the thin film coil 24 comprising a series of the first and second coils 24A and 24B integral with each other is completed. Incidentally, both ends P1S and P2E of the thin film coil 24 are connected to a driving circuit (not shown).

As described above, the method according to the third embodiment includes forming the spiral first coil 24A having the top surface 24AU having the greatest width, the top surface 24AU being the end surface opposite to the gap layer 23; previously forming the insulating layer 24ZL so as to fill the region 51 between windings of the first coil 24A; and then selectively etching the insulating layer 24ZL using the first coil 24A as the mask. Thus, the method of the third embodiment can facilitate forming the insulating wall 24Z which covers the side surface 24AS of the first coil 24A, because of slight influence of uncertainties such as variations in surface properties of the first coil and non-uniformity in the tilt angles of the side surfaces of the first coil, as compared to the conventional method which includes depositing an insulating film around the first coil by using sputtering or the like. Therefore, the method of the third embodiment enables forming the thin film coil in a narrower space, while ensuring electrical insulation between the windings of the first and second coils 24A and 24B. The method using a fluidic resist or SOG to form the insulating wall, in particular, can achieve electrical insulation between the windings of the first and second coils 24A and 24B with greater ease. Accordingly, the thin film magnetic head including the thin film coil of the third embodiment can ensure stable recording characteristics, while coping with a higher recording density.

Fourth Embodiment

Next, the description is given with regard to a fourth embodiment of the invention. A thin film coil and a thin film magnetic head according to the fourth embodiment have the same structures as the thin film coil and the thin film magnetic head according to the above-described first embodiment shown in FIGS. 1 to 5, and the fourth embodiment is different from the first embodiment only in the forming method (and the manufacturing method). Hereinafter, the description is therefore given with regard to only a method of forming a thin film coil according to the fourth embodiment.

The thin film coil of the fourth embodiment comprises the first coil formed by damascene technique as described in the above-mentioned second embodiment, and the second coil formed by the method using mainly photolithography as described by referring to the above-mentioned first embodiment. The description is given step by step below with reference to FIGS. 14A and 14B to 18A and 18B and FIGS. 11A and 11B to 13A and 13B with regard to the method of forming a thin film coil according to the fourth embodiment.

As shown in FIGS. 14A and 14B, the insulating layer 24ZL made of $Al_2O_3$ or the like is first formed on the overall surface on the gap layer 23 which acts as the substrate. The spiral resist pattern 44, which is wound around the axis perpendicular to the in-plane direction of the gap layer 23 in the in-plane direction thereof, is then selectively formed. Then, the insulating layer 24ZL is selectively etched using the resist pattern 44 as a mask. As shown in FIGS. 15A and 15B, this etching results in the spiral groove 53 having the opened end 53K having the greatest width, and the opened end 53K is located opposite to the gap layer 23. Desirably, the spiral groove 53 has a progressively greater width farther away from the gap layer 23, as viewed in the in-plane direction thereof. More specifically, it is desirable that the spiral groove 53 have the minimum width at the bottom 53B, a progressively greater width closer to the opened end 53K, and the maximum width at the opened end 53K. The region in which the insulating layer 24ZL does not undergo etching and thus remains is the region 51 between windings.

After the formation of the spiral groove 53, as shown in FIGS. 16A and 16B, the resist pattern 44 is removed, and the conductive film 124A is formed on the overall surface by using, for example, sputtering so as to fill at least the spiral groove 53. Other vacuum deposition, such as chemical vapor deposition, or plating may be used to form the conductive film 124A. As shown in FIGS. 17A and 17B, planarization then takes place using, for example, CMP, thereby forming a planarized surface containing the top surface 24AU of the first coil 24A covered with the insulating layer 24ZL. The first coil 24A is configured so that the top surface 24AU opposite to the gap layer 23 has the maximum width. When the spiral groove 53 has a progressively greater width farther away from the gap layer 23 as viewed in the in-plane direction thereof, the first coil 24A has the shape of an inverted trapezoid in cross section as viewed in the direction of thickness thereof.

After the formation of the first coil 24A, the insulating layer 24ZL is selectively etched by means of RIE or the like using the first coil 24A as a mask, as shown in FIGS. 18A and 18B. This etching allows a part of the insulating layer 24ZL to remain in the overhang region 51A which is in the shade of the top surface 24AU, thus forming the insulating wall 24Z which covers the side surface 24AS. The etching also allows the gap layer 23 to be exposed, thus forming the inner region 52. In FIGS. 18A and 18B, there is shown the example in which etching takes place in the direction perpendicular to the in-plane direction of the gap layer 23. However, an etching angle is not limited to this example, and a desired angle can be selected as the etching angle.

After the selective etching of the insulating layer 24ZL, the resist pattern 43 is selectively formed so that the inner region 52 remains, as shown in FIGS. 11A and 11B. As shown in FIGS. 12A and 12B, the second coil 24B is then formed so as to fill the inner region 52 which is not protected by the resist pattern 43. In particular when the second coil 24B is formed so that the thickness of the second coil 24B is less than the thickness of the first coil 24A, this configuration can ensure insulation between the respective side surfaces of the first and second coils 24A and 24B with higher reliability. Finally, as shown in FIGS. 13A and 13B, the overall surface is polished by using CMP or the like until at least the first coil 24A is exposed, and thus the first coil 24A is isolated from the second coil 24B by the insulating wall 24Z. In this case, further planarization takes place using CMP or the like so that the first and second coils 24A and 24B have a uniform thickness. Such planarization permits forming other layers on the coils with ease and high accuracy. Then, one end P1E of the first coil 24A is coupled to one end P2S of the second coil 24B, and thus the thin film coil 24 comprising a series of the first and second coils 24A and 24B integral with each other is completed. Incidentally, both ends P1S and P2E of the thin film coil 24 are connected to a driving circuit (not shown).

As described above, the method according to the fourth embodiment uses damascene technique to perform the process which includes previously forming the spiral groove 53 having the opened end 53K having the maximum width on the insulating layer 24ZL, the opened end 53K being located opposite to the gap layer 23; then forming the first coil 24A having the top surface 24AU having the maximum width so as to fill the spiral groove 53; and then selectively etching the insulating layer 24ZL using the first coil 24A as the mask. Thus, the method of the fourth embodiment can facilitate forming the insulating wall 24Z which covers the side surface 24AS of the first coil 24A, because of little influence of uncertainties such as variations in surface properties of the first coil and non-uniformity in the tilt angles of the side surfaces of the first coil, as compared to the conventional method which includes depositing an insulating film around the first coil by using sputtering or the like. Therefore, the method of the fourth embodiment enables forming the thin film coil in a narrower space, while ensuring electrical insulation between the windings of the first and second coils 24A and 24B. Accordingly, the thin film magnetic head including the thin film coil of the fourth embodiment can ensure stable recording characteristics, while coping with a higher recording density.

Although the invention has been described above in some embodiments, the invention is not limited to these embodiments and various modifications of the invention are possible. Specific examples are as follows. Although the invention has been described as applied to the combined thin film magnetic head in the above-mentioned embodiments, the invention is not necessarily limited to this head but may be applied to, for example, a record-only thin film magnetic head having an inductive magnetic transducer for use in writing, or a thin film magnetic head having an inductive magnetic transducer for use in both recording and reproducing. The invention may be, of course, applied to a thin film magnetic head having a structure including a writing element and a reading element which are stacked in reverse order. The thin film coil of the invention is not limited to application to the thin film magnetic head but may be applied to other electronic devices such as a thin film inductor.

In the above-mentioned embodiments, the levels of the top surfaces of the first and second coils and the insulating wall (i.e., the surfaces thereof opposite to the substrate) are contained in one plane (or the coils and the wall have a uniform thickness), as shown in FIG. 4. However, the level of the top surface 24AU of the first coil 24A may be different from the level of a top surface 24BU of the second coil 24B, as shown in FIG. 21A. In this instance, the step of polishing and planarization using CMP or the like can be omitted. In the above-mentioned embodiments, the first coil has the shape of an inverted trapezoid having a progressively greater width farther away from the substrate. However, the invention is not limited to this shape. For example, the first coil may have a T-shape having the side surfaces perpendicular to the surface of the substrate, as shown in FIG. 21B. In FIGS. 21A and 21B, there are not shown other parts constituting the thin film magnetic head, such as the insulating layer 26.

In the above-mentioned embodiments, plating is used to form the first and second coils. However, the invention is not limited to this method, and vacuum deposition such as sputtering or chemical vapor deposition may be used to form the coils.

As described above, according to the thin film coil or the thin film magnetic head of the invention, the first coil is configured so that the end surface opposite to the substrate has the greatest width and its side surface overhangs, and the insulating wall is configured to fill this overhang region. This allows the insulating wall to cover the side surface of the first coil, thus forming the thin film coil at higher densities, while ensuring electrical insulation between the windings of the first and second coils. When the thin film coil is applied to the thin film magnetic head, the thin film magnetic head can ensure stable recording characteristics, while coping with a higher recording density.

According to the method of forming a thin film coil or the method of manufacturing a thin film magnetic head according to a first aspect of the invention, the method includes previously forming the insulating layer so as to fill the spiral groove which is the region between windings of the spiral first coil having the end surface having the greatest width, the end surface being located opposite to the substrate; and then selectively etching the insulating layer using the first coil as the mask. This allows the insulating wall to cover the side surface of the first coil, thus forming the thin film coil at higher densities, while ensuring electrical insulation between the windings of the first and second coils. When the method of forming a thin film coil is applied to the method of manufacturing a thin film magnetic head, the thin film magnetic head can therefore ensure stable recording characteristics, while coping with a higher recording density. In particular when a fluidic organic material or SOG is used to form the insulating wall, this method can achieve electrical insulation between the windings of the first and second coils with greater ease.

According to the method of forming a thin film coil or the method of manufacturing a thin film magnetic head according to a second aspect of the invention, the method includes previously forming the spiral groove having the opened end having the greatest width, the opened end being located opposite to the substrate; then forming the first coil so as to fill the spiral groove, the first coil having the end surface having the greatest width, the end surface being located opposite to the substrate; and further selectively etching the insulating layer using the first coil as the mask. This allows the insulating wall to cover the side surface of the first coil, thus forming the thin film coil at higher densities, while ensuring electrical insulation between the windings of the first and second coils. When the method of forming a thin film coil is applied to the method of manufacturing a thin film magnetic head, the thin film magnetic head can therefore ensure stable recording characteristics, while coping with a higher recording density, as in the case of the first aspect.

Obviously many modifications and variations of the present invention are possible in the light of the above teachings. It is therefore to be understood that within the scope of the appended claims the invention may be practiced otherwise than as specifically described.

What is claimed is:

1. A thin film coil including:
    a spiral first coil formed on a substrate, the first coil being wound around an axis perpendicular to an in-plane direction of the substrate, the first coil having a width that varies in a direction parallel to the axis, the first coil having an end surface having a greatest width, the end surface being located opposite to the substrate;
    a second coil formed in a region between windings of the first coil; and
    an insulating wall which isolates the first coil from the second coil,
    wherein the insulating wall becomes progressively thinner farther away from the substrate.

2. A thin film coil according to claim 1, wherein the first coil has a progressively greater width farther away from the substrate.

3. A thin film coil according to claim 1, wherein the first coil is formed by using plating, sputtering or chemical vapor deposition.

4. A thin film coil according to claim 1, wherein the insulating wall is made of a cured fluidic organic material.

5. A thin film coil according to claim 1, wherein the insulating wall is made of spin on glass (SOG).

6. A thin film magnetic head including: at least two magnetic layers magnetically coupled to each other and facing each other with a gap layer in between near and in a surface to be faced with a recording medium; and a thin film coil sandwiched in between the two magnetic layers or in between other magnetic layers coupled to the two magnetic layers, the thin film coil including:
    a spiral first coil formed on a substrate, the first coil being wound around an axis perpendicular to an in-plane direction of the substrate, the first coil having a width that varies in a direction parallel to the axis, the first coil having an end surface having a greatest width, the end surface being located opposite to the substrate;
    a second coil formed in a region between windings of the first coil; and
    an insulating wall which isolates the first coil from the second coil,
    wherein the insulating wall becomes progressively thinner farther away from the substrate.

* * * * *